(12) United States Patent  
Kitani

(10) Patent No.: US 8,370,647 B2  
(45) Date of Patent: Feb. 5, 2013

(54) INFORMATION PROCESSING APPARATUS, INFORMATION PROCESSING METHOD, AND PROGRAM

(75) Inventor: Satoshi Kitani, Tokyo (JP)

(73) Assignee: Sony Opitarc Inc., Tokyo (JP)

( * ) Notice: Subject to any disclaimer, the term of this patent is extended or adjusted under 35 U.S.C. 154(b) by 375 days.

(21) Appl. No.: 12/694,579

(22) Filed: Jan. 27, 2010

(65) Prior Publication Data

US 2010/0199129 A1 Aug. 5, 2010

(30) Foreign Application Priority Data

Feb. 4, 2009 (JP) ................................ 2009-024053

(51) Int. Cl.
*G06F 11/00* (2006.01)
(52) U.S. Cl. ..... 713/193; 714/25; 714/57; 714/E11.002; 380/277
(58) Field of Classification Search .............. 724/24, 724/57, E11.002; 713/158, 165, 168, 169; 711/163, 154; 380/277, 201, 282, 255, 45
See application file for complete search history.

(56) References Cited

U.S. PATENT DOCUMENTS

| 2004/0205315 A1* | 10/2004 | Ripley et al. | 711/163 |
| 2005/0169118 A1 | 8/2005 | You et al. | |
| 2007/0113073 A1 | 5/2007 | Maillard et al. | |
| 2007/0199075 A1 | 8/2007 | Skoric et al. | |
| 2009/0097648 A1* | 4/2009 | Jung et al. | 380/255 |

FOREIGN PATENT DOCUMENTS

| JP | 2002-278842 A | 9/2002 |
| JP | 2002-542532 A | 12/2002 |
| JP | 2004-030593 A | 1/2004 |
| JP | 2004-032706 A | 1/2004 |
| JP | 2004-288280 A | 10/2004 |
| JP | 2005-045785 A | 2/2005 |
| JP | 2005-128637 A | 5/2005 |
| JP | 2005-129069 A | 5/2005 |
| JP | 2005-136965 A | 5/2005 |
| JP | 2005-341422 A | 12/2005 |
| JP | 2006-031818 A | 2/2006 |
| JP | 2006-270645 A | 10/2006 |
| JP | 2007-058749 A | 3/2007 |
| JP | 2007-059056 A | 3/2007 |
| JP | 2007-097128 A | 4/2007 |
| JP | 2007-141096 A | 6/2007 |
| JP | 2007-520011 A | 7/2007 |
| JP | 2007-529807 A | 10/2007 |

(Continued)

*Primary Examiner* — Jeffrey Pwu
*Assistant Examiner* — Nega Woldemariam
(74) *Attorney, Agent, or Firm* — Wolf, Greenfield & Sacks, P.C.

(57) ABSTRACT

An information processing apparatus includes: a memory in which an apparatus-unique key is stored, the apparatus-unique key being a key that is unique to the information processing apparatus; an input section that inputs user operation information; a communication section that performs data reception processing; a data processor that executes validity determination processing for the apparatus-unique key; and an output section that outputs a result of the validity determination processing executed by the data processor. The data processor receives, via the communication section, key-validity determination data for determining whether the apparatus-unique key is valid or invalid. The data processor also executes the apparatus-unique-key validity determination processing by using the key-validity determination data in response to a user instruction input via the input section, and outputs a result of the validity determination processing to the output section.

12 Claims, 14 Drawing Sheets

FOREIGN PATENT DOCUMENTS

| | | |
|---|---|---|
| JP | 2008-103007 | 5/2008 |
| WO | WO 2005/052802 A1 | 6/2005 |
| WO | WO 2005/121980 A1 | 12/2005 |
| WO | WO 2006/008972 A1 | 1/2006 |
| WO | WO 2006/109738 A1 | 10/2006 |
| WO | WO 2006/115252 A1 | 11/2006 |

* cited by examiner

FIG. 10

| Bit<br>Byte | 7 | 6 | 5 | 4 | 3 | 2 | 1 | 0 |
|---|---|---|---|---|---|---|---|---|
| 0 | CERTIFICATE TYPE: $01_{16}$ | | | | | | | |
| 1 | RESERVED | | | | | | | BEC |
| 2 | DATA LENGTH: $005C_{16}$ | | | | | | | |
| 3 | | | | | | | | |
| 4 | DRIVE ID | | | | | | | |
| ⋮ | | | | | | | | |
| 9 | | | | | | | | |
| 10 | RESERVED | | | | | | | |
| 11 | | | | | | | | |
| 12 | DRIVE PUBLIC KEY | | | | | | | |
| ⋮ | | | | | | | | |
| 51 | | | | | | | | |
| 52 | SIGNATURE DATA (Drive_Cert$_{sig}$) | | | | | | | |
| ⋮ | | | | | | | | |
| 91 | | | | | | | | |

INFORMATION PROCESSING APPARATUS, INFORMATION PROCESSING METHOD, AND PROGRAM

BACKGROUND OF THE INVENTION

1. Field of the Invention

The present invention relates to information processing apparatuses, information processing methods, and programs. More specifically, the present invention relates to an information processing apparatus, an information processing method, and a program which control use of content.

2. Description of the Related Art

Nowadays, DVDs (digital versatile discs), Blu-ray Discs®, and so on are used as data storage media. These information storage media are used to record and play back various types of content, such as movies and music.

Variations of the information storage media, such as DVD and Blu-ray Disc®, include read only media (on which data are pre-recorded and to which new data writing is not permitted), such as DVD-ROM and BD-ROM, and rewritable media (to which data can be written), such as DVD-RAM/R/RW, DVD+RW/+R and BD-R/RE.

Read only media on which various types of content, such as moves and/or music, are pre-recorded are supplied to users. Use of data-writable information storage media, such as rewritable media, allows users to record and use, for example, broadcast content, content downloaded over a network, and content obtained via terminal apparatuses installed at public places.

For content that is pre-recorded on discs or obtained through broadcasting, a network, or the like, the creators or sellers of the content in many cases hold copyrights, distribution rights, and so on of music data, moving-image data, and so on of the content. Thus, many pieces of content supplied to the users are subjected to usage control to ensure that the content is not unlimitedly copied. More specifically, for example, a control scheme for preventing unauthorized copying and so on is employed, permitting only legitimate users to use (e.g., to play back) content.

One scheme for the content usage control is to encrypt content for distribution. A key held by only a user and/or an apparatus having legitimate content-usage permission is used to decrypt the encrypted content to execute playback thereof. One example of such a usage control system will be described.

Playback apparatuses (players) for playing back content recorded on media (such as DVDs and Blu-ray Discs®), recording apparatuses (recorders) for recording data to the media, drive apparatuses for performing playback from or recording to the media loaded thereinto, and so on are supplied to users, with apparatus-unique keys (electronic keys) being associated with the respective apparatuses and being stored in the memories of the apparatuses.

The keys stored in the apparatuses are issued by a license administrator (an administration center) that offers a content copyright protection technology. The manufacturing plant of the playback apparatuses and so on record the individual keys, distributed from the administration center, in the memories in playback apparatuses. The apparatuses in which the apparatus-unique keys are stored are supplied to users through sales outlets and so on. One example of the administration center is AACS LA (Advanced Access Content System Licensing Administrator) that licenses the AACS, which is a copyright protection technology for HD (high definition) movie content.

Content stored/recorded on media such as DVDs is generally encrypted. Thus, when the user performs playback, a content cryptographic key is calculated using the key stored in the apparatus to perform processing for decrypting the encrypted content. When content is be recorded to media, the content is encrypted with the content cryptographic key and the encrypted content is recorded together with the content cryptographic key subjected to encryption processing using the key stored in the apparatus. With such an arrangement in which the apparatus-unique key is used to execute decryption playback processing or encryption recording processing on content, unauthorized copy or use of the content is prevented.

However, for example, when the key held in the apparatus is compromised and disclosed, this results in a situation in which the key that is supposed to be unique to the single apparatus can be used for many other apparatuses manufactured without a legitimate license. As a result, a third party that sells or distributes unauthorized apparatuses that enable content copy or content use circumventing the restrictions of the AACS specification may appear, which may lead to a situation in which unauthorized use of the content may not be prevented.

The AACS specification employs a scheme for dealing with such a situation. One example is a system for invalidating (revoking) a key, held in an apparatus in accordance with an AACS license contract, at a point when the administration center (AACS LA) finds a critical violation, such as key compromise, against compliance rules of the contract.

The key invalidation processing (revocation processing) is already available as invalidation processing (revocation processing) for public keys or as processing using an MKB (media key block), which is a cryptographic information (cryptographic key) block generated based on a key-structure key distribution scheme (which is one type of broadcast encryption scheme). The key invalidation processing that complies with the AACS specification is also analogous to the already-available invalidation processing. The processing using the MKB is disclosed in, for example, Japanese Unexamined Patent Application Publication No. 2008-103007.

The MKB contains encrypted data of a media key used for processing for decrypting encrypted content. The media key can be obtained through MKB processing using the key stored in the apparatus. The MKB is data that is sequentially updated. For example, when a key compromise as described is found out and the key is to be invalidated, an MKB from which a valid media key may not be acquired when MKB processing using the compromised key is performed is generated.

The MKB updated as described above is stored on media, such as DVDs, that are made commercially available and are supplied to users. Even when an attempt is made to perform content playback with an apparatus in which an invalidated key is stored, the content playback is disabled since the media key may not be obtained from the updated MKB.

With such a system, however, even when the apparatus-unique key of an apparatus of a user has been invalidated, the user generally does not notice that the key of his or her apparatus has been invalidated unless he or she uses a medium on which data (such as the latest MKB) indicating the invalidation is recorded.

When revocation according to the AACS specification occurs, a situation in which content stored on old discs can be played back but content stored on new discs is not played back may occur. In such a situation, the user of the apparatus suspects that it is due to a failure of the apparatus and may ask the manufacturer of the apparatus or the like to repair the apparatus.

In order to prepare for such a situation, the apparatus manufacturer employs a particular scheme. Specifically, during storage of the keys, received from the administration center, into apparatuses to be supplied, the manufacturer creates an apparatus-and-key list containing data indicating correspondences between identifiers (serial numbers) of the apparatuses and identification information of apparatus-unique keys stored in the apparatuses and semi-permanently stores the apparatus-and-key list.

The apparatus manufacturer receives, when the key stored in the apparatus manufactured thereby is invalided, key information of the invalidated key from the administration center and uses the apparatus-and-key list to obtain the apparatus identifier (serial number) information set for the invalidated key, in order to identify the product in which the invalidated key is contained. Thereafter, the product serial number is reported to the user via media, such as a web site, provided by the manufacturer. Such a process makes it possible to offer customer services, such as prompting product replacement or refund, to users who have apparatuses in which invalidated keys are stored.

Such an approach, however, has the following problems:
(1) Data Storage Facility and Maintenance Cost that Accumulates Continuously Every Year For products that are designed and manufactured with every possible care being taken to ensure that incidents involving product invalidation and so on, which are events that incur loss to the apparatus manufacturer, do not occur, such an incident or a key invalidation involved therein could occur any time but it can also be said that the probability of the occurrence is nearly zero. The manufacturer continuously storing the apparatus-and-key list in case of the key validation means continuously bearing a facility cost (for facility-investment and maintenance) that is proportional to the number of products manufactured. The cost adds up along with the volume of data that accumulates year by year. Since the upper limit of the data storage period is not clearly specified in a contract for copyright protection technology (e.g., the AACS), the apparatus manufacturer may have to semi-permanently store the data.
(2) Problem in Service For example, when the apparatus manufacturer is to replace a key-containing component during repair or maintenance service after shipment of the product, it is also generally necessary to go through a procedure for updating the apparatus-and-key list. Alternatively, for replacement of a key-containing component during repair or maintenance service, it is also necessary to perform work for retrieving the key, associated with the serial number of the product, from the apparatus-and-key list and for recording the retrieved key back to the product after the component replacement. During the work, service stations located in various regions have to access a database in which the apparatus-and-key list is stored. Also, recording the electronic key (which is strictly confidential information) during the repair or maintenance service also involves taking measures for advanced information security for not only a key-recording instrument but also facilities and personnel, and correspondingly, the facility-investment cost and maintenance cost at the service stations increase.
(3) Problem with Apparatus Installed in PC For products (such as Blu-ray Disc® drives) that are installed in PC main units, checking the serial numbers of the products generally necessitates removing the products from the PC main units. However, not every user can perform such check processing. In particular, for notebook PCs that are increasingly becoming popular among PC products in recent years, removing built-in Blu-ray Disc® drives or the like involves work that is equivalent to completely disassembling the PC main units, and is thus far from being practical.

SUMMARY OF THE INVENTION

In view of the foregoing situation, it is desirable to provide an information processing apparatus, an information processing method, and a program which do not involve processing for generating and managing the above-described apparatus-and-key list, i.e., data indicating correspondences between apparatuses and keys, and which can efficiently notify a user of key invalidation when it occurs.

According to a first embodiment of the present invention, there is provided an information processing apparatus. The information processing apparatus includes: a memory in which an apparatus-unique key is stored, the apparatus-unique key being a key that is unique to the information processing apparatus; an input section that inputs user operation information; a communication section that performs data reception processing; a data processor that executes validity determination processing for the apparatus-unique key; and an output section that outputs a result of the validity determination processing executed by the data processor. The data processor receives, via the communication section, key-validity determination data for determining whether the apparatus-unique key is valid or invalid; executes the apparatus-unique-key validity determination processing by using the key-validity determination data in response to a user instruction input via the input section; and outputs a result of the validity determination processing to the output section.

The key-validity determination data may include a diagnostic program for determining whether the apparatus-unique key is valid or invalid, and the data processor may executes the diagnostic program to perform the apparatus-unique-key validity determination processing and may output a result of the validity determination processing to the output section.

The apparatus-unique key may be a device key used to obtain a media key from a media key block in which the media key is stored. The media key is used for cryptography processing during playback of content from a medium or during recording of content to the medium. The key-validity determination data may contain a media key block (MKB) having a structure that permits a valid media key to be obtained only when a valid device key is used. The data processor may execute processing on the media key block (MKB) by using the device key stored in the memory in the information processing apparatus and may perform validity determination on the device key on the basis of processing for checking whether or not a valid media key is obtained.

The key-validity determination data may contain an invalidated-device identifier list that is an identification information list of information processing apparatuses in which invalidated apparatus-unique keys are stored. The data processor may execute processing for comparing a device identifier, which is an apparatus-unique key held in the information processing apparatus, with the invalidated-device identifier list, and may perform the apparatus-unique-key validity determination processing on the basis of processing for checking whether or not the device identifier held in the information processing apparatus is registered in the invalidated-device identifier list.

According to a second embodiment of the present invention, there is provided an information processing apparatus. The information processing apparatus includes: an input section that inputs user operation information; a communication section that performs data reception processing; a communication interface that communicates with a drive apparatus that records data to a medium or plays back data from the medium; a data processor that executes validity determination processing for an apparatus-unique key that is a key unique to the drive apparatus; and an output section that outputs a result of the validity determination processing executed by the data processor. The data processor receives, via the communication section, key-validity determination data for determining whether the apparatus-unique key is valid or invalid; executes communication with the drive apparatus in response to a user instruction input via the input section; executes the apparatus-unique-key validity determination processing on the basis of a result obtained by comparing a drive identifier with the key-validity determination data, the drive identifier being an identifier of a key held in the drive apparatus; and outputs a result of the validity determination processing to the output section.

The key-validity determination data may contain an invalidated-device identifier list that is an identification-information list of information processing apparatuses in which invalidated apparatus-unique keys are stored. The apparatus-unique key may be a drive public key issued to the drive apparatus. The data processor may issue, to the drive apparatus, a request for obtaining the drive identifier recorded in a drive-public key certificate containing the drive public key and may perform the apparatus-unique-key validity determination processing on the basis of processing for checking whether or not the obtained drive identifier is registered in the invalidated-device identifier list.

The key-validity determination data may contain an invalidated-device identifier list that is an identification-information list of information processing apparatuses in which invalidated apparatus-unique keys are stored. The apparatus-unique key may be a drive public key issued to the drive apparatus. The data processor may output, to the drive apparatus, the invalidated-device identifier list and a request command for comparing the drive identifier recorded in a drive-public key certificate containing the drive public key, and may perform the apparatus-unique-key validity determination processing on the basis of a result obtained by the comparison and input from the drive apparatus.

According to a third embodiment of the present invention, there is provided an information processing method to be executed by an information processing apparatus. The information processing method includes the steps of: causing a data processor to receive, via a communication section, key-validity determination data for determining whether an apparatus-unique key that is a key unique to the information processing apparatus is valid or invalid; causing the data processor to execute validity determination processing for the apparatus-unique key by using the key-validity determination data using in response to a user instruction input via an input section; and causing the data processor to output a result of the validity determination processing to an output section.

According to a fourth embodiment of the present invention, there is provided an information processing method to be executed by an information processing apparatus. The information processing method includes the steps of: causing a data processor to receive, via a communication section, key-validity determination data for determining whether an apparatus-unique key that is a key unique to a drive apparatus connected to the information processing apparatus is valid or invalid; causing the data processor to execute communication with the drive apparatus in response to a user instruction input via an input section and to execute validity determination processing for the apparatus-unique key on the basis of a result obtained by comparing a drive identifier with the key-validity determination data, the drive identifier being an identifier of a key held in the drive apparatus; and causing the data processor to output a result of the validity determination processing to an output section.

According to a fifth embodiment of the present invention, there is provided a program for causing an information processing apparatus to execute information processing. The program includes the steps of: causing a data processor to receive, via a communication section, key-validity determination data for determining whether an apparatus-unique key that is a key unique to the information processing apparatus is valid or invalid; causing the data processor to execute validity determination processing for the apparatus-unique key by using the key-validity determination data in response to a user instruction input via an input section; and causing the data processor to output a result of the validity determination processing to an output section.

According to a sixth embodiment of the present invention, there is provided a program for causing an information processing apparatus to execute information processing. The program includes the steps of: causing a data processor to receive, via a communication section, key-validity determination data for determining whether an apparatus-unique key that is a key unique to a drive apparatus connected to the information processing apparatus is valid or invalid; causing the data processor to execute communication with the drive apparatus in response to a user instruction input via an input section and to execute validity determination processing for the apparatus-unique key on the basis of a result obtained by comparing a drive identifier with the key-validity determination data, the drive identifier being an identifier of a key held in the drive apparatus; and causing the data processor to output a result of the validity determination processing to an output section.

The program according to the embodiment of the present invention is, for example, a computer program that can be supplied to general-purpose computers capable of executing various program codes, through communication media and/or storage media provided in a computer-readable format. The provision of the program in a computer-readable format allows computer systems to realize processing according to the program.

Further objects, features, and advantages of the present invention will become apparent from the following detailed description in conjunction with embodiments of the present invention and accompanying drawings. The term "system" as used herein refers to a logical collection of multiple apparatuses and is not limited to an architecture in which apparatuses having individual configurations are provided in a single housing.

The configuration according to one embodiment of the present invention performs processing for determining whether the apparatus-unique key, which is a key unique to the information processing apparatus and is used for processing for recording content to a medium or playing back content stored on a medium and protected with a copyright protection technology or the like, is valid or invalid. More specifically, the information processing apparatus externally receives the key-validity determination data, executes apparatus-unique-key validity determination processing using the key-validity determination data in response to a user instruction, and outputs a result of the validity determination processing to the output section. The key-validity determination data includes the latest MKB and the latest invalided-device list or the diagnostic program containing data thereof. The information processing apparatus can perform validity determination processing for the apparatus-unique key stored in the information processing apparatus by using the latest data at an arbitrary time, without dependence on an apparatus or a medium on which the latest MKB and/or the latest public-key revocation list are recorded, and also can notify the user of the result of the validity determination processing.

BRIEF DESCRIPTION OF THE DRAWINGS

FIG. 10 illustrates the data structure of a public-key certificate;

DESCRIPTION OF THE PREFERRED EMBODIMENTS

An information processing apparatus, an information processing method, and a program according to embodiments of the present invention will be described below in detail with reference to the accompanying drawings. The description below is given according to the following chapters and sections.

1. Example of Content Playback Processing using Key Stored in Apparatus
   (1-1) Content Recording/Playback Processing Configuration Using Recording/Playback Apparatus into which Drive Apparatus is Integrated
   (1-2) Content Recording/Playback Processing Configuration Using Recording/Playback Apparatus, Such as PC, to which Drive Apparatus is Connected
2. Embodiments of Apparatus-Unique-Key Validity Check Processing and Result Notification Processing
   (2-1) First Embodiment of Apparatus-Unique-Key Validity Check Processing and Result Notification Processing
   (2-2) Second Embodiment of Apparatus-Unique-Key Validity Check Processing and Result Notification Processing
   (2-3) Third Embodiment of Apparatus-Unique-Key Validity Check Processing and Result Notification Processing
   (2-4) Fourth Embodiment of Apparatus-Unique-Key Validity Check Processing and Result Notification Processing
   (2-5) Fifth Embodiment of Apparatus-Unique-Key Validity Check Processing and Result Notification Processing
   (2-6) Sixth Embodiment of Apparatus-Unique-Key Validity Check Processing and Result Notification Processing
3. Function and Configuration of Information Processing Apparatus

[1. Example of Content Playback Processing using Key Stored in Apparatus]

An overview of content recording/playback processing using an apparatus-unique key (an electronic key) is first described before a description is given of embodiments of the present invention. Processing for playing back/recording content from/to media (information storage media) can be broadly classified into two processing modes:

(1-1) processing using a recording/playback apparatus into which a drive apparatus is integrated; and (1-2) processing using a recording/playback apparatus, such as a personal computer (PC), to which a drive apparatus is connected.

The processing modes (1-1) and (1-2) will be sequentially described hereinbelow according to the chapters and sections.

[(1-1) Processing using Recording/Playback Apparatus into which Drive Apparatus is Integrated]

First, content recording/playback processing using a recording/playback apparatus into which a drive apparatus is integrated will be described with reference to FIG. 1.

Figure 1:
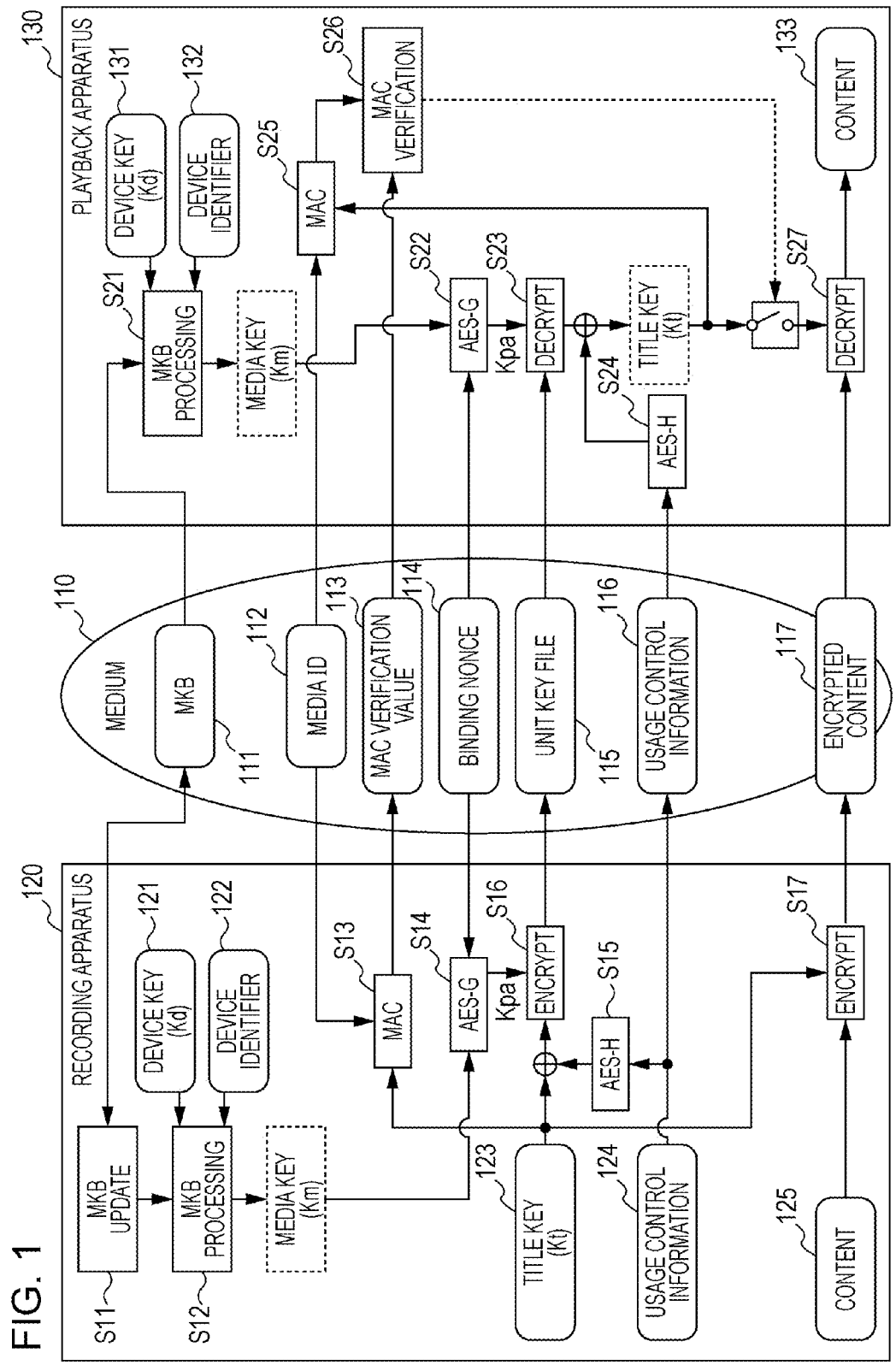
FIG. 1 is a diagram illustrating AACS-specification-compliant content recording and playback processing in an apparatus into which a drive is integrated.

FIG. 1 is a diagram illustrating a sequence of a case in which a recording/playback apparatus into which a drive apparatus is integrated is used to perform content recording and playback processing in accordance with an AACS (Advanced Access Content System) specification.

Referring to FIG. 1, a medium (an information storage medium) 110 shown at the center is a data-recordable medium that complies with the AACS specification. A media ID 112 that is a medium-unique identifier is recorded on the medium 110. The media ID 112 is recorded in a burst cutting area (BCA) in an inner peripheral area of the medium 110. The BCA is a data recording area based on a system that is different from a typical data recording system.

In FIG. 1, a recording apparatus 120 and a playback apparatus 130 which comply with the AACS specification are illustrated at the left side and the right side, respectively. The recording apparatus 120 executes content recording processing on the medium 110 through a recording sequence according to the AACS specification. The playback apparatus 130 executes content-playback processing on content recorded on the medium 110 through a playback sequence according to the AACS specification.

(Information Recorded on Medium)

Information recorded on the AACS-compliant medium 110 will be described first. As shown in FIG. 1, an MKB (media key block) 111, the media ID (media Identifier) 112, a MAC verification value 113, a binding nonce 114, a unit key file 115, a usage control information (usage rule) 116, and encrypted content 117 are recorded on the medium 110. These pieces of data will be described below in order.

(1) MKB (Media Key Block)

The MKB (media key block) 111 is a cryptographic information (cryptographic key) block generated based on a tree-structure key distribution scheme, which is one type of broadcast encryption scheme. The MKB 111 enables a media key (Km) used for content decryption to be obtained by only processing (decryption) based on a device key (Kd) stored in an information processing apparatus of a user having a valid license. Thus, the MKB 111 contains the media key (Km) as secret information. The MKB 111 also has version information indicating newness of its update and verification data (Dv) for verifying the authenticity of the media key (Km).

The MKB 111 enables only a user device (an information processing apparatus) having a valid license to acquire the media key (Km) and disables an invalidated (revoked) user device to acquire the media key (Km). That is, the MKB 111 is a cryptographic information block having a structure that enables acquirement of the secret information only when a device key that is an apparatus-unique key assigned to a certain selected device is used and that disables acquirement of the secret information when a device key that is assigned to a revoked device (i.e., an excluded device) is used.

By changing a set of keys used to encrypt the media key (Km) stored in the MKB, an administration center, which is a licensing entity, can generate an MKB having a structure that disables decryption, i.e., that causes a media key used for content decryption to be unable to be decrypted with a device key stored in a certain user device. This makes it possible to supply decryptable encrypted content to only a device having a valid license, by executing, at an arbitrary time, invalidation (revocation) processing for excluding unauthorized devices.

(2) Media ID

The media ID 112 is identification information that is unique to the medium (the information storage medium). For AACS-compliant media, for example, Blu-ray Discs®, a burst cutting area (BCA) is defined as a physical specification and a 128-bit media ID is recorded in the BCA. The media ID 112 is set as data that is recordable by only a certain licensed media manufacturer. Data recording/playback that complies with the AACS specification involves predetermined processing, such as processing for checking whether content read from the medium 110 and recorded complies with a legitimate procedure.

(3) MAC Verification Value

The MAC verification value 113 is a MAC (message authentication code) generated in MAC generation processing performed on the media ID through use of title keys (also referred to as "CPS (content protection system) unit keys" or "unit keys") used as content cryptographic keys. The MAC is verification data for verifying a combination of the media ID (which has a value that is unique to each medium) and the title keys for recorded content. During recording of content, a recording apparatus generates and records the MAC verification value to a medium. During playback of the content, verification of the MAC is performed, and success of the verification is a condition for playback of the content.

(4) Binding Nonce

The binding nonce 114 is information used for encrypting the title keys (also called the "CPS unit keys" or "unit keys") used as content cryptographic keys. During processing of recording content to the medium, the binding nonce 114 is used to encrypt the title keys, and during processing of playback of content from the medium, the binding nonce 114 is used to obtain the title keys through decryption of the encrypted title keys. The title keys are obtained as a result of the decryption and are used to decrypt the encrypted content.

(5) Unit Key File

The unit key file 115 is a file in which encrypted key data of the title keys is stored. The unit key file 115 is also called a "CPS unit key file". Encrypted content to be recorded to the medium 110 is segmented into units, which are individually associated with corresponding title keys (CPS unit keys), are encrypted therewith, and are recorded. The unit key file 115 is a file in which encrypted title keys corresponding to the units contained in the encrypted content recorded to the media are recorded. During playback of the content recorded on the medium, the titles keys that are different for the respective segmented units are generated and decryption processing is performed.

(6) Usage Control Information

The usage control information (usage rule) 116 is data containing content-usage control information and includes, for example, copy/playback control information (CCI). More specifically, the usage control information 116 includes playback restriction information and copy restriction information for usage control for the encrypted content 117 stored on the medium 110. The copy/playback control information (CCI) can be set in various manners, for example, can be set as information for each CPS unit set as a content management unit or may be set as information for multiple CPS units.

(7) Encrypted Content

The encrypted content 117 is recorded in accordance with the AACS specification and contains, for example, an AV (audio visual) stream of moving-image content, such as HD (high-definition) movie content (which contains high-definition moving-image data). The content is stored in accordance with a specific AV data format. In order to realize usage control that is different for each of segmented pieces of content, the segmented pieces of content are assigned respective different keys, i.e., the above-described title keys (also referred to as "CPS unit keys" or "unit keys"), are encrypted, and are stored. A unit to which one title key is assigned is referred to as the "content management unit (CPS unit)".

(Content Recording Processing)

Next, a description will be given of content recording processing that the recording apparatus 120 executes on the medium 110. The recording apparatus 120 is an AACS-compliant recording apparatus and holds, in its memory, a device key (Kd) 121, which is an apparatus-unique key, and a device identifier (device number) 122, which is an identifier of the device key (Kd) held in the apparatus. The device identifier (device number) 122 is defined as, for example, a 31-bit apparatus-specific value. The device key 121 and the device identifier (device number) 122 are information used for processing (decrypting) the MKB 111 recorded on the medium 110.

First, in step S11, the recording apparatus 120 executes processing for updating the MKB. The recording apparatus 120 can store the MKB in the memory in the recording apparatus 120. The MKB is updated in accordance with the revocation status of the device and has individual version information. In step S11, the recording apparatus 120 compares the version of the MKB stored in its memory with the version of the MKB 111 recorded on the medium 110. When the MKB 111 recorded on the medium 110 is a new version, the recording apparatus 120 executes MKB update processing for replacing the MKB recorded in its memory.

Next, in step S12, the recording apparatus 120 obtains the media key (Km) by executing MKB processing (decryption) using the device key 121 and the device identifier (device number) 122 which are stored in the memory. For the AACS, each of the media key (Km) and the media-key verification value (Dv) is 128-bit data. When top 64 bits of a calculation value of an AES-E (Km, Dv) is equal to a hexadecimal number "0123456789ABCDEF", it is verified that a correct media key is obtained. In this case, the arithmetic operation AES-E (a, b) represents AES-algorithm-based encryption processing performed on data "b" with a key "a". When the device key 121 held in the recording apparatus 120 is revoked, a correct media key may not be obtained from the MKB. That is, only when the device key 121 held in the recording apparatus 120 is not revoked, a correct media key is obtained with success.

Next, in step S13, the recording apparatus 120 reads the media ID 112 (which is a medium-unique identifier) recorded on the medium 110, generates a MAC value of the media ID by using title keys (Kt) 123 generated by, for example, random-number generation, as cryptographic keys for content to be recorded to the medium 110, and records the generated MAC value to the medium 110 as a MAC verification value 113. As described above, the media ID 112 recorded on the medium 110 is 128-bit data recorded in accordance with the AACS specification and the title key (Kt) 123 is also 128-bit data.

In step S14, the recording apparatus 120 generates a cryptographic key (Kpa) by executing cryptographic-key generation processing (AES-G) using the media key (Km) obtained from the MKB and the binding nonce 114 read from the medium 110. AES-G represents a one-way-function-based key-generation algorithm according to an AES algorithm.

In addition, in steps S15 and S16, the recording apparatus 120 encrypts the title keys 123, generates a unit key file 115 containing the encrypted title keys, and records the unit key file 115 to the medium 110. First, in step S15, the recording apparatus 120 executes hash-value arithmetic operation (AES-H) on usage control information (usage control) 124 for content to be recorded to the medium 110 and executes exclusive-OR (XOR) with the title keys 123. In step S16, the recording apparatus 120 executes encryption using the cryptographic key (Kpa) to generate encrypted title keys (Kte), which are encrypted data of the title keys 123, and records the unit key file 115 containing the encrypted title keys (Kte) to the medium 110.

Thus, the encrypted title keys (Kte) are determined by:

$$Kte = AES\text{-}E(Kpa, [Kt](XOR)[AES\text{-}H(\text{Usage Rule})])$$

where the arithmetic operation AES-E (a, b) represents AES-algorithm-based encryption processing performed on data "b" with a key "a".

The arithmetic operation AES-H (Usage Rule) represents AES-algorithm-based hash-value calculation processing performed on the usage control information (usage rule) 124 and the arithmetic operation [a](XOR)[b] represents exclusive-OR of "a" and "b".

The usage control information 124 is usage control information for recoded content and is supplied over, for example, broadcast waves or from a content management server. The usage control information 124 is subjected to processing for implementing recording/playback control for, for example, copy generation control, as appropriate. The recording apparatus 120 also records the usage control information 124 to the medium 110.

In addition, in step S17, the recording apparatus 120 executes encryption processing on content 125 by using the title keys 123 and records resulting encrypted content 117 to the medium 110.

(Content Playback Processing)

Next, a description will be given of processing executed by the playback apparatus 130 illustrated at the right side of FIG. 1, i.e., playback processing of the encrypted content 117 recorded on the medium 110. The playback apparatus 130 is also an AACS-compliant apparatus, similarly to the recording apparatus 120, and stores, in a memory in the playback apparatus 130, a device key (Kd) 131, which is an apparatus-unique key, and a device identifier (device number) 132, which is an identifier of the device key (Kd) 131 held in the apparatus.

First, in step S21, the playback apparatus 130 executes MKB processing (decryption) by using the device key 131, stored in its memory, and the device identifier (device identifier) 132 to thereby obtain a media key (Km). In this case, when top 64 bits of a calculation value of a function AES-E (Km, Dv) using the media key (Km) and the media-key verification value (Dv) is equal to a hexadecimal value "0123456789ABCDEF", it is determined that a correct media key is obtained. When the device key 131 held in the playback apparatus 130 has been revoked, a correct media key may not be obtained from the MKB. That is, a correct media key can be successfully obtained only when the device key 131 held in the playback apparatus 130 is unrevoked.

In step S22, the playback apparatus 130 generates a cryptographic key (Kpa) by executing cryptographic-key generation processing (AES-G) using the media key (Km) obtained from the MKB and the binding nonce 114 read from the medium 110. AES-G represents a one-way-function-based key-generation algorithm according to an AES algorithm.

In steps S23 and S24, the playback apparatus 130 further executes processing for generating title keys. First, in step S23, the playback apparatus 130 reads the unit key file 115 containing the encrypted title keys (Kte) from the medium 110 and executes decryption processing using the cryptographic key (Kpa). Next, in step S24, the playback apparatus 130 executes hash-value arithmetic operation (AES-H) on the usage control information 116 read from the medium 110 and executes an XOR operation between the result of the hash-value arithmetic operation (AES-H) and the result of the decryption performed in step S23 to thereby obtain the title keys (Kt).

Thus, the playback apparatus 130 obtains the title keys (Kt) in accordance with the following function:

$$Kt = [AES\text{-}D(Kpa, Kte)](XOR)[AES\text{-}H(\text{Usage Rule})]$$

where the arithmetic operation AES-D (a, b) represents AES-algorithm-based decryption processing performed on data "b" with a key "a".

The arithmetic operation AES-H (Usage Rule) represents AES-algorithm-based hash-value calculation processing performed on the usage control information (usage rule) and the arithmetic operation [a](XOR)[b] represents exclusive-OR of "a" and "b".

In step S25, the playback apparatus 130 reads the media ID 112, which is a medium-unique identifier, recorded on the medium 110, and generates a MAC value of the media ID by using the generated title keys (Kt). In step S26, the playback apparatus 130 executes MAC verification processing for comparing the generated MAC value with the MAC verification value 113 read from the medium 110. When both MAC values are equal to each other, it is verified that the combination of the media ID and the generated title keys is a correct combination. In step S27, with the condition that the MAC verification succeeds, the playback apparatus 130 starts decryption processing of the encrypted content 117 by using the title keys.

As a result of the decryption processing of the encrypted content 117 through the use of the title keys in step S27, content 133 is obtained and playback processing is performed.

[(1-2) Processing Using Recording/Playback Apparatus, such as PC, to which Drive Apparatus is Connected]

Next, a description will be given of a content recording/playback processing configuration using a recording/playback apparatus, such as a PC, to which a drive apparatus is connected.

Figure 2:
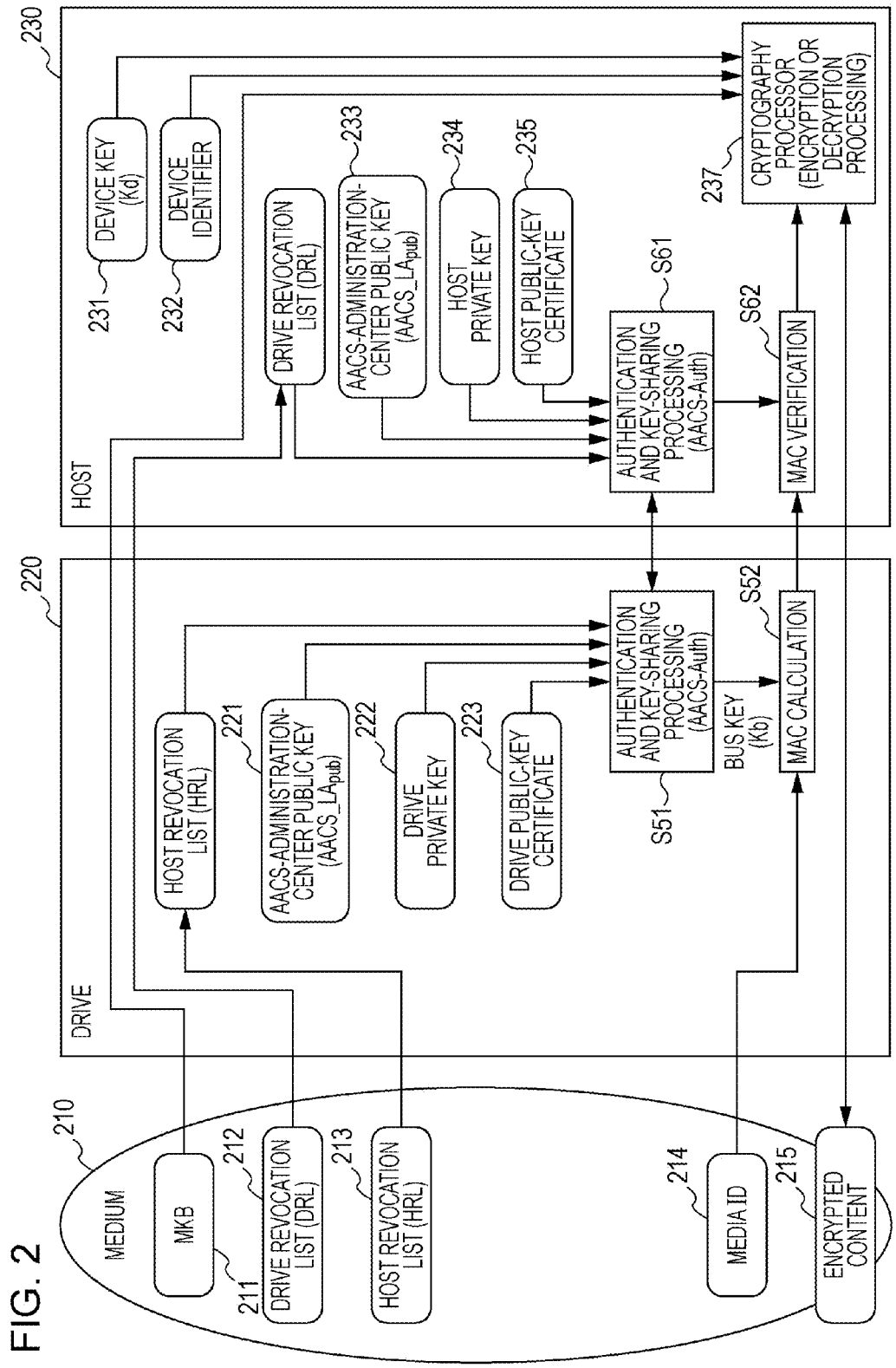
FIG. 2 is a diagram illustrating AACS-specification-compliant content recording and playback processing in a content recording/playback processing configuration using a recording/playback apparatus, such as a PC, to which a drive apparatus is connected.

FIG. 2 is a diagram illustrating a sequence of a case in which a recording/playback apparatus, such as a PC, to which a drive apparatus is connected is used to perform content recording and playback processing in accordance with the AACS (advanced access content system) specification.

Referring to FIG. 2, a medium (an information storage medium) 210 illustrated at the left side is a data-recordable medium that complies with the AACS specification. Specifically, as described above in conjunction with an example of a Blu-ray Disc®, for example, a 128-bit media ID is recorded in a burst cutting area (BCA) on the medium 210. A drive 220 illustrated at the right side of the medium 210 is an AACS-specification-compliant drive apparatus that accesses the medium 210 to record/read data to/from the medium 210. A host 230 illustrated at the right end is an AACS-specification-compliant host that records/reads data to/from the medium 210 via the drive 220 through communication therewith. The host 230 is implemented by an apparatus, such as a PC, and executes a content recording/playback application program that complies with the AACS specification.

(Information Recorded on Medium)

Information recorded on the AACS-compliant medium 210 will be described first. As shown in FIG. 2, an MKB (media key block) 211, a drive revocation list (DRL) 212, a host revocation list (HRL) 213, a media ID (media identifier) 214, and encrypted content 215 are recorded on the medium 210. Although not shown in FIG. 2, a MAC verification value, a binding nonce, a unit key file, usage control information (usage rule), and so on, which are recorded on the medium 110 described above with reference to FIG. 1, are also recorded on the medium 210. Processing of using the those pieces of data is analogous to that of the drive-apparatus-integrated recording/playback apparatus described above with reference to FIG. 1, and thus is not illustrated in FIG. 2 and is not described hereinbelow.

(1) MKB (Media Key Block)

As described above, the MKB (media key block) 211 is a cryptographic information (cryptographic key) block generated based on a tree-structure key distribution scheme, which is one type of broadcast encryption scheme. The MKB 211 is a cryptographic information block that enables a media key (Km) used for content decryption to be obtained by only processing (decryption) based on a device key (Kd) stored in an information processing apparatus of a user having a valid license. The MKB 211 has version information indicating newness of its update and verification data (Dv) for verifying the authenticity of the media key (Km).

(2) Drive Revocation List (DRL)

The drive revocation list (DRL) 212 is a list in which identification information of keys held in drives determined to be fraudulent drive apparatuses by an AACS administration center and identification information of keys of drives determined to be fraudulently handled are recorded. That is, the drive revocation list (DRL) 212 is the so-called "blacklist". One example of the identification information recorded in the drive revocation list (DRL) 212 is identification information of drive public-key certificates for the drives. The drive revocation list (DRL) 212 has version information indicating newness of its update and a signature using a private key of the AACS administration center. The signature prevents tampering of the drive revocation list (DRL) 212.

(3) Host Revocation List (HRL)

The host revocation list (HRL) 213 is a list in which identification information of keys held in hosts determined to be fraudulent hosts by the AACS administration center and identification information of keys of hosts determined to be fraudulently handled are recorded. That is, the host revocation list (HRL) 213 is the so-called "blacklist". One example of the identification information recorded in the host revocation list (HRL) 213 is identification information of host public-key certificates for the hosts. The host revocation list (HRL) 213 has version information indicating newness of its update and a signature using a private key of the AACS administration center. The signature prevents tampering of the host revocation list (HRL) 213.

(4) Media ID

The media ID 214 is identification information that is unique to the medium (information storage medium), as described above. For AACS-compliant media, for example, next-generation discs, such as Blu-ray Disc® Recordable and Blu-ray Disc® Rewritable, a burst cutting area (BCA) is defined as a physical specification and a 128-bit media ID is recorded in the BCA. The media ID is set as data that is recordable by only a certain licensed media manufacturer. Data recording/playback that complies with the AACS specification involves predetermined processing, such as verification processing on data read from the medium 210.

(5) Encrypted Content

The encrypted content 215 is recorded in accordance with the AACS specification, as described above, and contains, for example, an AV (audio visual) stream of moving-image content, such as HD (high-definition) movie content (which contains high-definition moving-image data). The content is stored in accordance with a specific AV data format. In order to realize usage control that is different for each of segmented pieces of content, the segmented pieces of content are assigned respective different keys, i.e., the above-described title keys (also referred to as "CPS unit keys" or "unit keys"), are encrypted, and are stored. A unit to which one title key is assigned is referred to as a "content management unit (CPS unit)".

(Content Recording/Playback Processing)

Next, a description will be given of a sequence of a case in which the host 230 reads data from the medium 210 via the drive 220 to record or play back content. The host 230 shown in FIG. 2 has a cryptography processor 237. In processing of recording content to the medium 210, the cryptography processor 237 executes processing that is analogous to the processing executed by the recording apparatus 120 described above with reference to FIG. 1. In processing of playing back content from the medium 210, the cryptography processor 237 executes processing that is similar to the processing executed by the playback apparatus 130 described above with reference to FIG. 1.

The host 230 and the drive 220 execute host-drive authentication and key-sharing processing (steps S51 and S61) shown in FIG. 2 as a condition for starting processing at the cryptography processor 237. In the processing, the host 230 and the drive 220 use their shared bus key (Kb) to execute MAC generation (calculation) (step S52) and MAC verification (step S62), respectively, on the media ID 214 recorded on the medium 210. With the condition that the MAC verification succeeds, the cryptography processor 237 in the host 230 performs content recording or playback processing.

A description will now be given of the host-drive authentication and key-sharing processing (steps S51 and S61) shown in FIG. 2. In the authentication and key-sharing processing, an authentication and key-sharing processing sequence specified by the AACS is executed. In this processing, the individual apparatuses generally execute processing in the following manner.

The drive 220 reads the host revocation list (HRL) 213 from the medium 210, checks the signature of the host revocation list (HRL) 213 by using an AACS-administration-center public key 221 to verify that it is not tampered with, and compares the version of a host revocation list (HRL) stored in a memory in the drive 220 with the version of the host revocation list (HRL) 213 recorded on the medium 210. When the host revocation list (HRL) 213 recorded on the medium 210 is a new version, the drive 220 executes HRL update processing for replacing the host revocation list recorded in its memory. Subsequently, the drive 220 checks that identification information of a public key of the host 230 is not stated in the host revocation list (HRL) recorded in the memory, that is, verifies that the public key of the host 230 is unrevoked.

The host 230 obtains the drive revocation list (DRL) 212 from the medium 210 via the drive 220, checks the signature of the drive revocation list (DRL) 212 by using an AACS-administration-center public key 233 to verify that it is not tampered with, and compares the version of a drive revocation list stored in a memory in the host 230 with the version of the drive revocation list (DRL) 212 recorded on the medium 210. When the drive revocation list (DRL) 212 recorded on the medium 210 is a new version, the host 230 executes DRL update processing for replacing the drive revocation list recorded in the memory. Subsequently, the host 230 checks that the identification information of the public key of the drive 220 is not stated in the drive revocation list (DRL) recorded in the memory, that is, checks that the public key of the drive 220 is unrevoked.

When it is verified that both public keys of the opposing apparatuses are unrevoked, the drive 220 and the host 230 execute encrypted-data communication according to the AACS specification to share the bus key (Kb) as a shared private key. In this processing, a drive private key 222, a drive public-key certificate (drive certificate) 223, a host private key 234, and a host public-key certificate (host certificate) 235 are used.

As described above, the identification information of keys held in drives determined to be fraudulent drive apparatuses by the administration center and the identification information of drive public-key certificates for keys of drives determined to be fraudulently handled are recorded in the drive revocation list (DRL). Similarly, the identification information of keys held in hosts determined to fraudulent hosts by the administration center and the identification information of host public-key certificates for keys of hosts determined to be fraudulently handled are recorded in the host revocation list (HRL).

When the identification number of the host public-key certificate or drive public-key certificate of the opposing apparatus is recorded in the drive or host revocation list, it is determined in the host-drive authentication and key-sharing processing (steps S51 and S61) shown in FIG. 2 that the public-key certificate of the opposing apparatus is revoked. Thus, subsequent processing is aborted.

In the configuration shown in FIG. 2, the pair of the drive private key 222 and the drive public key contained in the drive public-key certificate 223 are apparatus-unique keys of the drive. Similarly, the pair of the host private key 234 and the host public key contained in the host public-key certificate are apparatus-unique keys of the host. The host 230 further holds a device key (Kd) 231 and a device identifier (device number) 232 as apparatus-unique keys that are similar to those of the recording apparatus 120 and the playback apparatus 130 described above with reference to FIG. 1.

Only when the validity of the drive public-key certificate 223 containing the drive public key (which is an apparatus-unique key of the drive) and the validity of the host public-key certificate 235 containing the host public key (which is an apparatus-unique key of the host) are verified, the host-drive authentication and key-sharing processing (steps S51 and S61) succeeds and the processing is completed.

When the host-drive authentication and key-sharing processing (steps S51 and S61) is completed, the drive 220 reads the media ID 214 from the medium 210, executes MAC generation processing using the bus key (Kb), and transmits a generated MAC value and the media ID 214 to the host 230.

In step S62, the host 230 executes MAC verification processing using the bus key (Kb). That is, the host 230 uses the bus key (Kb) to perform MAC generation processing on the media ID received from the drive 220 and compares the generated MAC value with the MAC value received from the drive 220. When two MAC values match each other, the host 230 determines that the verification is successful and the cryptography processor 237 executes content recording or playback processing that complies with the AACS specification. The sequence of the AACS-specification-compliant content recording or playback processing executed by the cryptography processor 237 is substantially the same as the processing described above with reference to FIG. 1. The host 230 uses information of the device key (Kd) 231 and the device identifier (device number) 232, held in the memory, to execute content recording or playback processing according to the sequence specified by the AACS.

As described above, when the host reads data from the medium via the drive to record or play back content, the host-drive authentication and key-sharing processing is performed and success of the authentication and success of the key sharing are conditions for executing the content recording or playback. In addition, the MAC generation and the verification processing are performed on the media ID by using the shared key (the bus key (Kb)) and success of the verification is a condition for starting the content recording or playback. In general, use of a medium on which a 128-bit media ID is recorded is a requirement in the AACS specification.

In the processing examples described above with reference to FIGS. 1 and 2, processing using the device key and/or the public key(s) as apparatus-unique keys is performed during playback of content stored on the medium or processing of recording content to the medium. When the validities of the device key and/or the public key(s) are not verified, content playback/recording processing is not executed.

That is, when the apparatus-unique key (the device key or public key) is invalidated, either of processing for obtaining the media key through the MKB processing using the device key and the authentication and key-sharing processing that involves checking of revocation of the public-key certificate fails and subsequent content playback/recording processing is not executed. Thus, this arrangement prevents an authorized apparatus from using the content.

As described above, the MKB is sequentially updated in accordance with the state of validity expiration or invalidation of the device key. The public key contained in the public-key certificate may also be invalidated by validity expiration or invalidation processing. The revocation list containing the invalidation information of the public key is also sequentially updated in accordance with the state of invalidation of the public key. In other words, a new revocation list is issued.

However, only when an medium on which a pre-update MKB and a pre-update revocation list are stored is used, a device (a playback apparatus, a recording apparatus, or a device such as a drive) that holds an invalidated device key or the public-key certificate containing the public key can use content without any problem. When a medium on which an updated MKB and an updated revocation list are stored is used, a situation in which content may not be used occurs suddenly.

When such a situation is encountered, the user regards that it is due to a failure of the apparatus and makes an inquiry to the apparatus manufacturer. In order to prepare for such a situation, the apparatus manufacturer generally creates an apparatus-and-key list containing data indicating correspondences between identifiers (serial numbers) of apparatuses manufactured thereby and identification information of apparatus-unique keys stored in the apparatuses, as described above.

In case of an event that the apparatus manufactured by the manufacturer is invalidated, the manufacturer generally has to semi-permanently store the apparatus-and-key list in order to promptly identify an apparatus in which an invalidated key is stored after receiving the invalidated key information from the administration center, to notify the user of the identifier (serial number) of the apparatus to be revoked, and to deal with an inquiry from the user. Work and cost for processing for managing and updating the apparatus-and-key list are on the rise day by day.

A description below is given of a configuration in which, without use of such an apparatus-and-key list, the user apparatus executes apparatus-unique-key validity check processing and can notify the user of a result of the validity check processing.

[2. Embodiments of Apparatus-Unique-Key Validity Check Processing and Result Notification Processing]

Some information processing apparatuses that perform apparatus-unique-key validity check processing and result notification processing will be described next as embodiments of the present invention.

[(2-1) First Embodiment of Apparatus-Unique-Key Validity Check Processing and Result Notification Processing]

Figure 3:
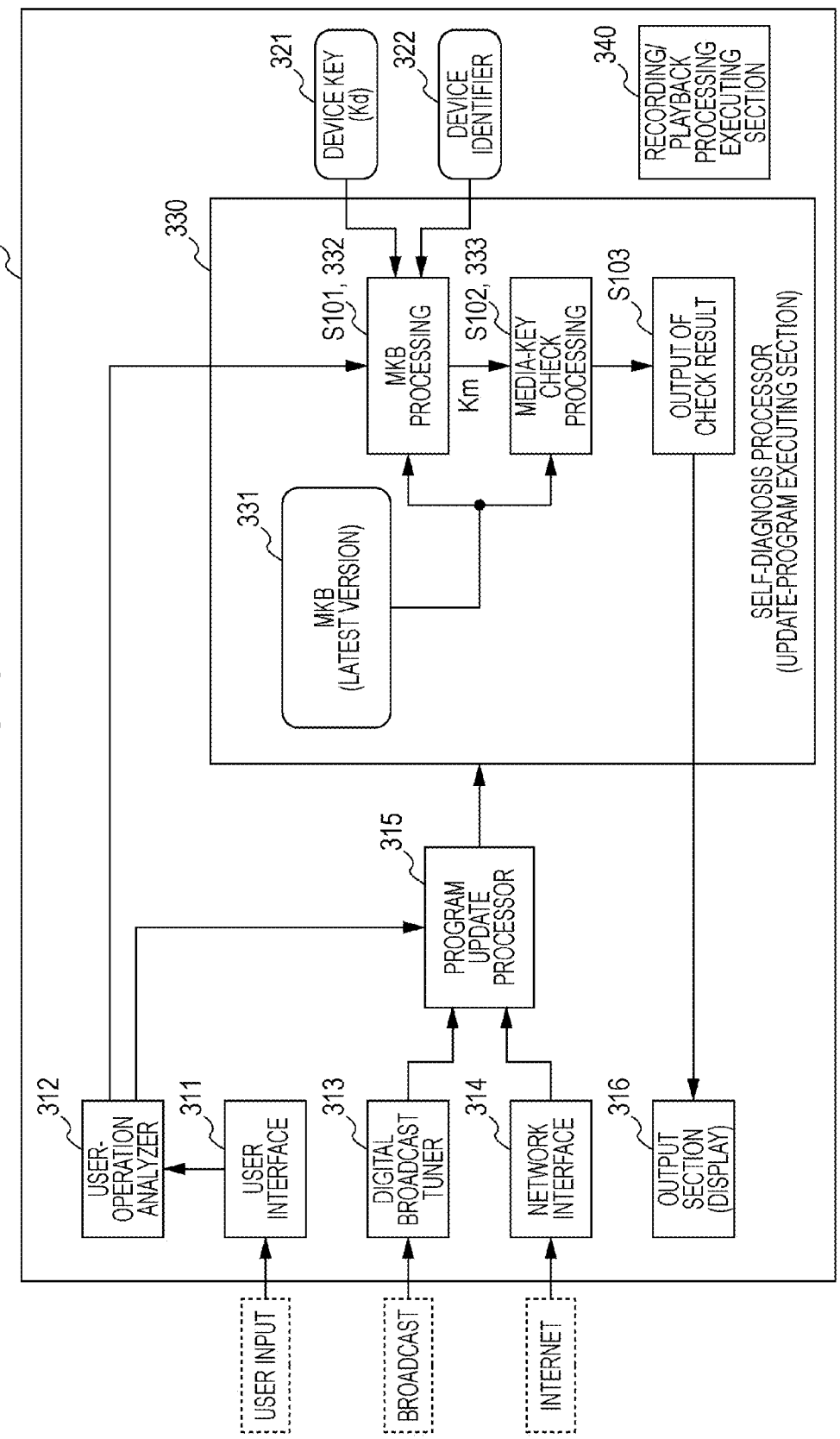
FIG. 3 is a diagram illustrating apparatus-unique-key validity check processing and result notification processing which are executed by an information processing apparatus according to a first embodiment of the present invention.
Figure 4:
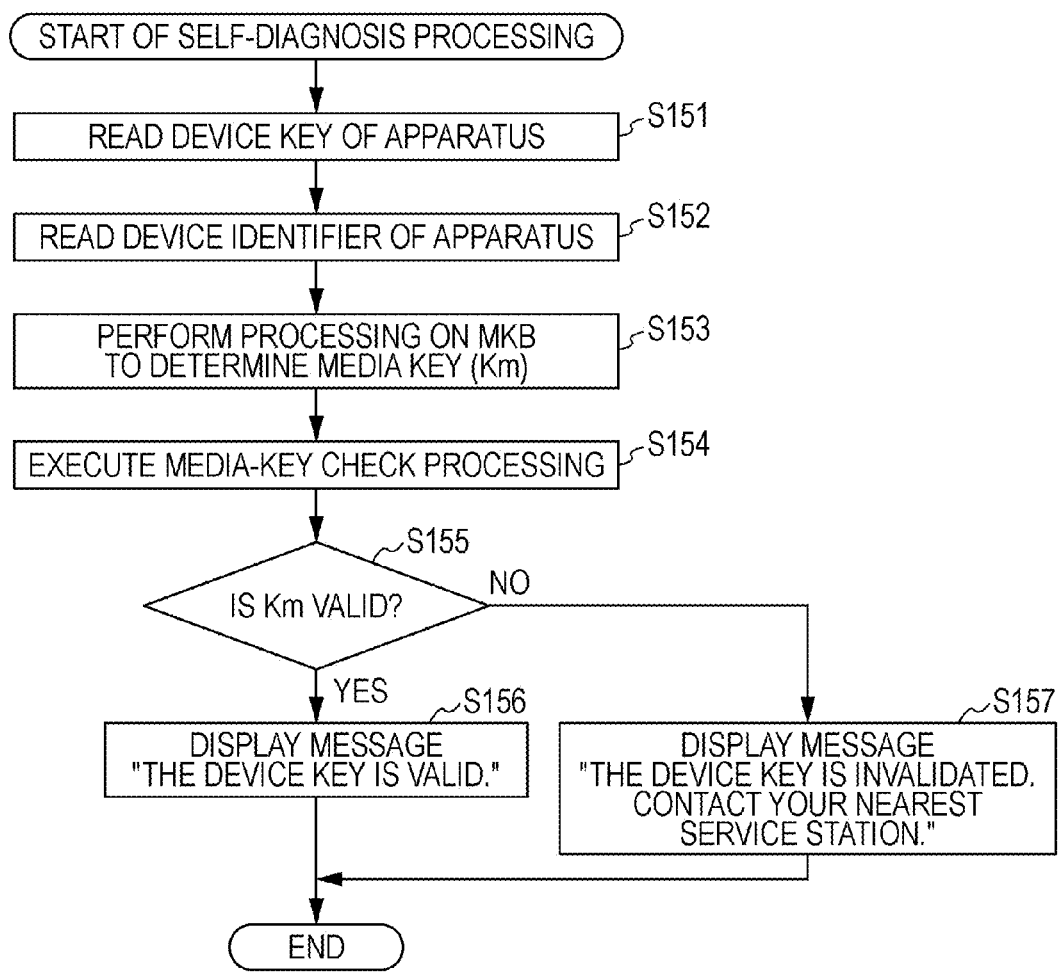
FIG. 4 is a flowchart illustrating a sequence of the apparatus-unique-key validity check processing and the result notification processing which are executed by the information processing apparatus according to the first embodiment of the present invention.

First, a first embodiment of apparatus-unique-key validity check processing and result notification processing will be described with reference to FIGS. 3 and 4. FIG. 3 is a diagram illustrating the configuration of an information processing apparatus according to a first embodiment of the present invention. FIG. 4 is a flowchart illustrating the sequence of processing executed by the information processing apparatus according to the first embodiment of the present invention.

An information processing apparatus 310 shown in FIG. 3 executes content playback or recording processing using a medium, such as a DVD or a Blu-ray Disc®. The content playback and recording processing using a medium is performed by a recording/playback processing executing section 340 in the same manner as the processing described above with reference to FIG. 1.

The information processing apparatus 310 shown in FIG. 3 is an apparatus, such as a recorder for a DVD, Blu-ray Disc®, or the like or a television set or PC equipped with a recording playback apparatus for such media.

The information processing apparatus 310 shown in FIG. 3 holds a device key (Kd) 321 as an apparatus-unique key and further holds, in a memory, a device identifier (device number) 322, which is a unique identifier of the device key (Kd) 321 held in the apparatus.

As described above, the device key (Kd) 321, which is an apparatus-unique key, is used to obtain a media key from the MKB. The media key is used for content decryption processing when the recording/playback processing executing section 340 plays back content from the medium and is also used for content encryption processing when the recording/playback processing executing section 340 records content to the medium. The device key (Kd) 321 can be invalidated by the administration center when fraudulent usage or the like is found out.

The information processing apparatus 310 shown in FIG. 3 receives a diagnostic program, used to determine the validity of the device key (Kd) 321 (which is an apparatus-unique key), through broadcast waves and a digital broadcast tuner 313 or through a network (such as the Internet) and a network interface 314.

The diagnostic program is supplied from, for example, the manufacturer of the information processing apparatus 310 and is transmitted as part of an update program to be received over digital broadcast. For example, in digital broadcast, update programs for causing data processing programs in television sets, video recorders, and so on (which are receivers of the digital broadcast) to be updated to their latest versions are sequentially transmitted to the television sets, the video recorders, and so on. The receivers of the television sets, video recorders, and so on receive the update programs to perform processing for updating the internal programs. Such program-update processing in typical digital broadcast is disclosed in, for example, Japanese Unexamined Patent Application Publication No. 8-195952. As in the related art, the diagnostic program can be transmitted/received through processing that is analogous to the transmission/reception processing of the update program.

Thus, the information processing apparatus 310 shown in FIG. 3 receives the diagnostic program, used to determine the validity of the device key (Kd) 321, through the digital broadcast tuner 313 or the network interface 314. The program containing the diagnostic program is input to a program update processor 315. The program update processor 315 executes program-update processing for replacing the program, already installed on the apparatus, with the received program. During the processing, the diagnostic program for the apparatus-unique key is also replaced with a new program.

The received diagnostic program contains the latest version of an MKB. This MKB corresponds to an MKB (latest version) 331 illustrated in FIG. 3. Latest revocation information is embedded in the MKB (latest version) 331. The manufacturer of the information processing apparatus receives the latest version of the MKB from the administration center and supplies the diagnostic program containing the received latest MKB to the user information processing apparatus.

The user gives an instruction via a user interface 311 at an arbitrary time so as to execute the diagnostic program for the apparatus-unique key. The user instruction information input via the user interface 311 is analyzed by a user-operation analyzer 312. The diagnostic program is started in accordance with a result of the analysis.

The diagnostic program is executed by a self-diagnosis processor (an update-program executing section) 330 shown in FIG. 3. Processing performed by the self-diagnosis processor (update-program executing section) 330 will now be described.

The self-diagnosis processor (update-program executing section) 330 executes processing steps S101 to S103 in accordance with the externally received diagnostic program. First, in step S101, the self-diagnosis processor 330 executes MKB processing.

In the MKB processing in step S101, the device key (Kd) 321 (which is an apparatus-unique key of the information processing apparatus 310) and the device identifier (device number) 322 are used to perform processing for obtaining a media key (Km) from the MKB (latest version) 331 contained in the received diagnostic program.

As described above, when a valid device key (Kd) is used, a valid media key (Km) can be obtained from the MKB. However, when an invalidated (revoked) device key (Kd) is used, a valid media key (Km) may not be obtained from the MKB. This makes it extremely difficult to correctly play back content and to record content while maintaining playback compatibility with other apparatuses.

Next, in step S102, media-key verification processing is executed. In this processing, it is checked whether the media key (Km) obtained in the processing performed on the MKB 331 has a valid value or an invalid value. When top 64 bits of a calculation value of a function AES-E (Km, Dv) using the media key (Km) and the media-key verification value (Dv) is equal to a hexadecimal value "0123456789ABCDEF", it is determined that the media key (Km) has a valid value.

Next, in step S103, processing for outputting a result of the verification is performed. In this processing, a result corresponding to the validity/invalidity of the device key (Kd) is output on an output section (a display) 316. For example, when a correct media key is obtained with success, a message indicating that the device key (Kd) is valid is output. For example, when acquirement of a correct media key fails, a message indicating that the device key (Kd) is invalidated is output. As a result of this processing, the user can check whether the apparatus-unique key (i.e., the device key (Kd) 321) stored in the information processing apparatus 310 is valid or invalidated.

FIG. 4 is a flowchart illustrating a sequence of apparatus-unique-key validity check processing executed by the self-diagnosis processor 330 in the information processing apparatus 310 shown in FIG. 3.

First, in step S151, the self-diagnosis processor 330 reads the device key (Kd) 321 from the memory in the information processing apparatus 310.

Next, in step S152, the self-diagnosis processor 330 reads the device identifier (device number) 322 from the memory in the information processing apparatus 310.

In step S153, by using the device key (Kd) 321 and the device identifier (device number) 322 read from the memory, an MKB processing section 332 in the self-diagnosis processor 330 executes processing on the MKB (latest version) 331, contained in the externally received program, to thereby determine a media key (Km).

Next, in step S154, a media-key verification processing section 333 in the self-diagnosis processor 330 checks whether the media key (Km) determined in step S153 has a valid value or an invalid value. When it is determined in step S155 that the media key (Km) has a valid value, the process proceeds to step S156 in which a message "The device key is valid." is displayed and output via the output section (display) 316 as an output of the check result.

On the other hand, when it is determined in step S155 that the media key (Km) has an invalid value, the process proceeds to step S157 in which a message "The device key is invalidated." or the like is displayed and output via the output section (display) 316 as an output of the check result.

As a result of this processing, the user can check whether the apparatus-unique key (i.e., the device key (Kd) 321) stored in the information processing apparatus 310 is valid or invalidated.

[(2-2) Second Embodiment of Apparatus-Unique-Key Validity Check Processing and Result Notification Processing]

Figure 5:
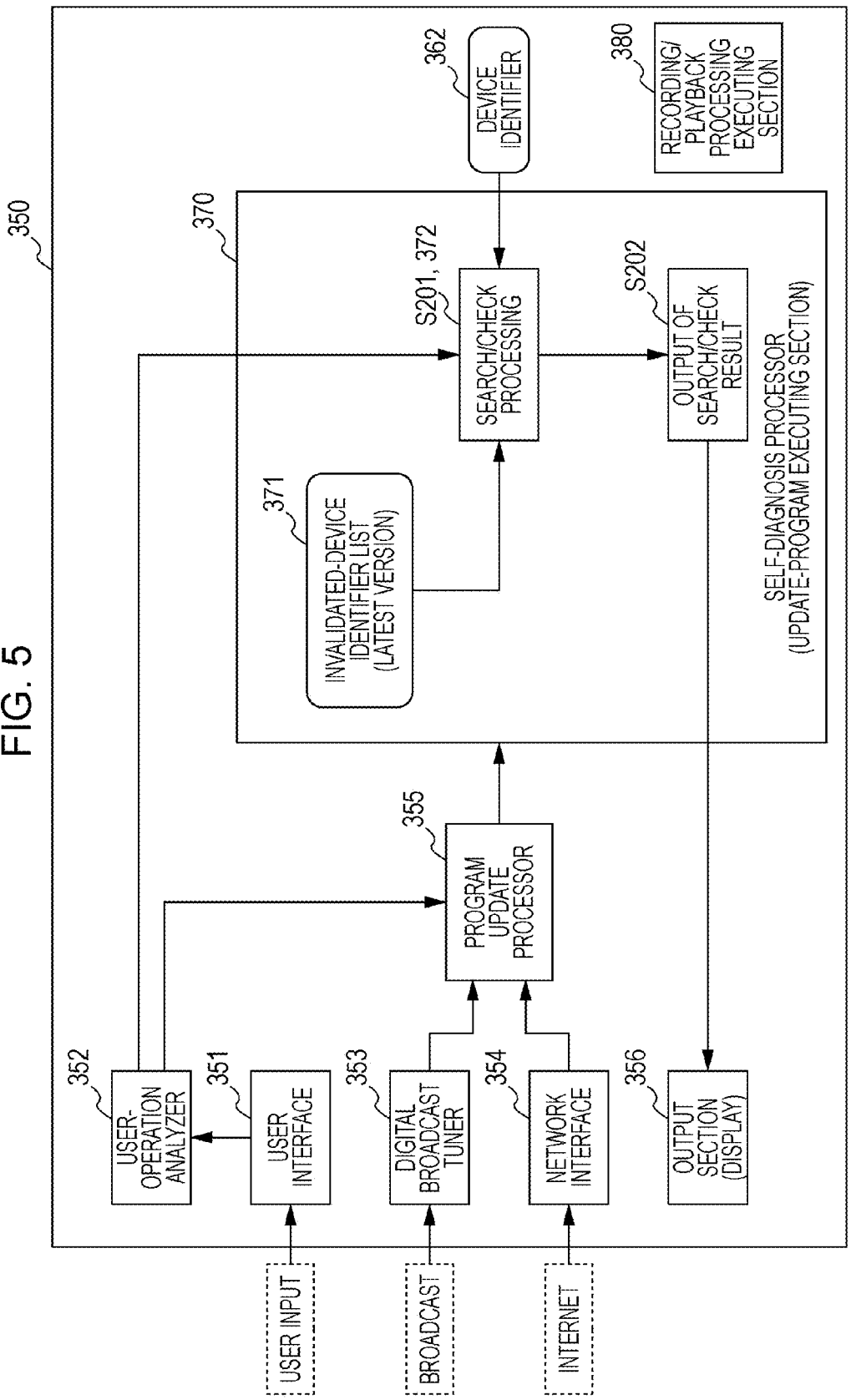
FIG. 5 is a diagram illustrating apparatus-unique-key validity check processing and result notification processing which are executed by an information processing apparatus according to a second embodiment of the present invention.
Figure 6:
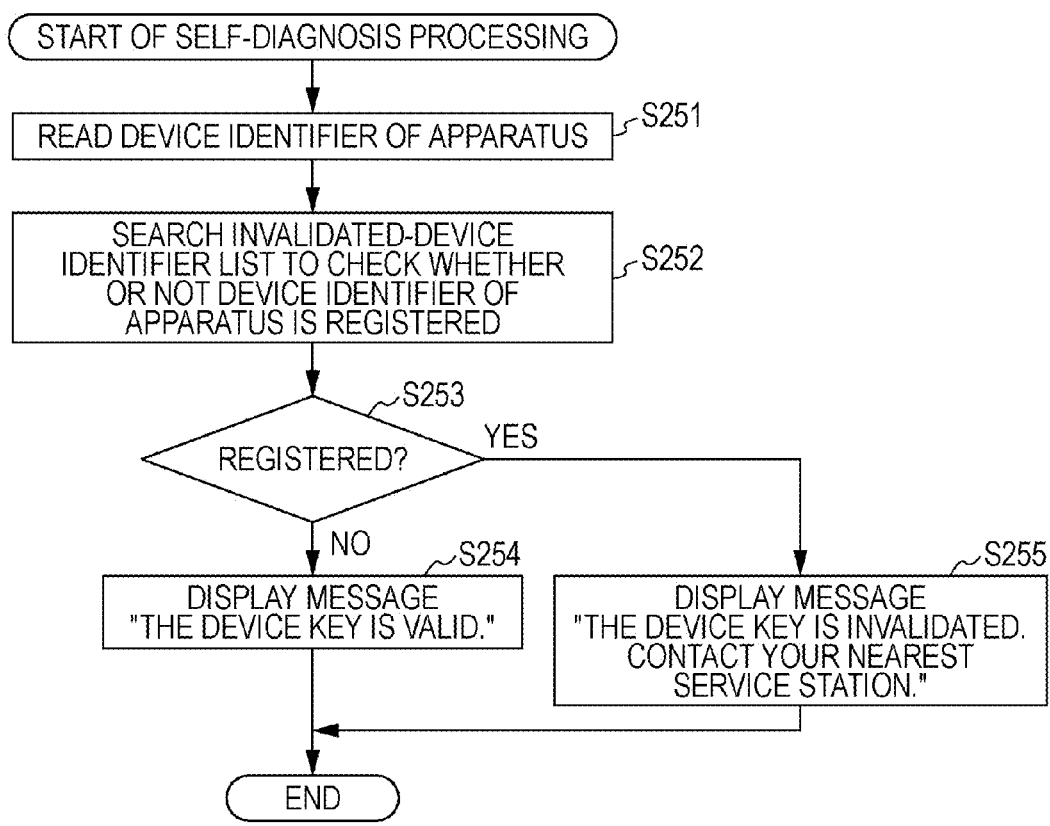
FIG. 6 is a flowchart illustrating a sequence of the apparatus-unique-key validity check processing and the result notification processing which are executed by the information processing apparatus according to the second embodiment of the present invention.

Next, a second embodiment of the apparatus-unique-key validity check processing and the result notification processing will be described with reference to FIGS. 5 and 6. FIG. 5 is a diagram illustrating the configuration of an information processing apparatus according to a second embodiment of the present invention. FIG. 6 is a flowchart illustrating the sequence of processing executed by the information processing apparatus according to the second embodiment of the present invention.

As in the first embodiment described above, an information processing apparatus 350 shown in FIG. 5 also executes content playback or recording processing using a medium, such as a DVD or a Blu-ray Disc®. The content playback and recording processing using a medium is performed by a recording/playback processing executing section 380 in the same manner as the processing described above with reference to FIG. 1.

In the processing described above with reference to FIGS. 3 and 4, the media-key determination processing is performed through the MKB processing using the device key (Kd), which is an apparatus-unique key. In the second embodiment, however, processing for checking whether the device key (Kd), which is an apparatus-unique key, is valid or invalidated is executed without execution of the MKB processing using the device key (Kd).

The information processing apparatus 350 shown in FIG. 5 holds a device key (Kd), not shown, in its memory as an apparatus-unique key. The information processing apparatus 350 further holds, in the memory, a device identifier (device number) 362 that is a unique identifier of the device key (Kd) held in the apparatus.

As in the first embodiment described above with reference to FIG. 3, the information processing apparatus 350 shown in FIG. 5 receives a diagnostic program, used to determine the validity of the device key (Kd) (which is a apparatus-unique key), through broadcast waves and a digital broadcast tuner 353 or through a network (such as the Internet) and a network interface 354.

The diagnostic program is input to a program update processor 355. The program update processor 355 executes program-update processing for replacing the program, already installed on the apparatus, with the received program. During the processing, the diagnostic program for the apparatus-unique key is also replaced with a new program.

The received diagnostic program contains an invalidated-device identifier list (latest version) 371. The manufacturer of the information processing apparatus receives the latest version of the invalidated-device identifier list from the administration center and supplies the diagnostic program containing the received latest invalidated-device identifier list to the user information processing apparatus.

The user gives an instruction via a user interface 351 at an arbitrary time so as to execute the diagnostic program for the apparatus-unique key. The user instruction information input via the user interface 351 is analyzed by a user-operation analyzer 352. The diagnostic program is started in accordance with a result of the analysis.

The diagnostic program is executed by a self-diagnosis processor (an update-program executing section) 370 shown in FIG. 5. Processing performed by the self-diagnosis processor (update-program executing section) 370 will now be described.

First, the self-diagnosis processor (update-program executing section) 370 executes search/check processing in step S201. In this processing, check processing is executed to check whether or not the device identifier (device number) 362 of the information processing apparatus 350 is recorded in the latest invalidated-device identifier list 371 contained in the externally received diagnostic program.

When the device identifier 362 is not recorded in the invalidated-device identifier list 371, it is determined that the device key (Kd), which is an apparatus-unique key, held in the information processing apparatus 350 is valid. In this case, in search/check-result output processing in step S202, a message indicating that the device key (Kd) is valid is output on an output section (a display) 356.

On the other hand, when the device identifier (device number) 362 is recorded in the invalidated-device identifier list 371, it is determined that the device key (Kd), which is an apparatus-unique key, stored in the information processing apparatus 350 is invalidated. In this case, a message indicating that the device key (Kd) is invalidated is output to the output section (display) 356. As a result of this processing, the user can check whether the apparatus-unique key (device key (Kd)) stored in the information processing apparatus 350 is valid or invalidated.

FIG. 6 is a flowchart illustrating a sequence of the apparatus-unique-key validity check processing executed by the self-diagnosis processor 370 in the information processing apparatus 350 shown in FIG. 5.

First in step S251, the self-diagnosis processor 370 reads the device identifier (device number) 362 from the memory in the information processing apparatus 350.

Next, in step S252, a search/check processing section 372 in the self-diagnosis processor 370 executes processing for checking whether or not the device identifier (device number) 362 of the information processing apparatus 350 is registered in the externally received invalidated-device identifier list 371.

When it is determined in step S253 that the device identifier 362 of the information processing apparatus 350 is not registered in the invalidated-device identifier list 371, the process proceeds to step S254. In step S254, a message "The device key is valid." is displayed and output via the output section (display) 356 as an output of the search/check result.

On the other hand, when it is determined in step S253 that the device identifier (device number) 362 of the information processing apparatus 350 is registered in the invalidated-device identifier list 371, the process proceeds to step S255. In step S255, a message "The device key is invalidated." or the like is displayed and output via the output section (display) 316 as an output of the search/check result.

As a result of this processing, the user can check whether the apparatus-unique key (the device key (Kd)) stored in the information processing apparatus 350 is valid or invalidated.

[(2-3) Third Embodiment of Apparatus-Unique-Key Validity Check Processing and Result Notification Processing]

Figure 7:
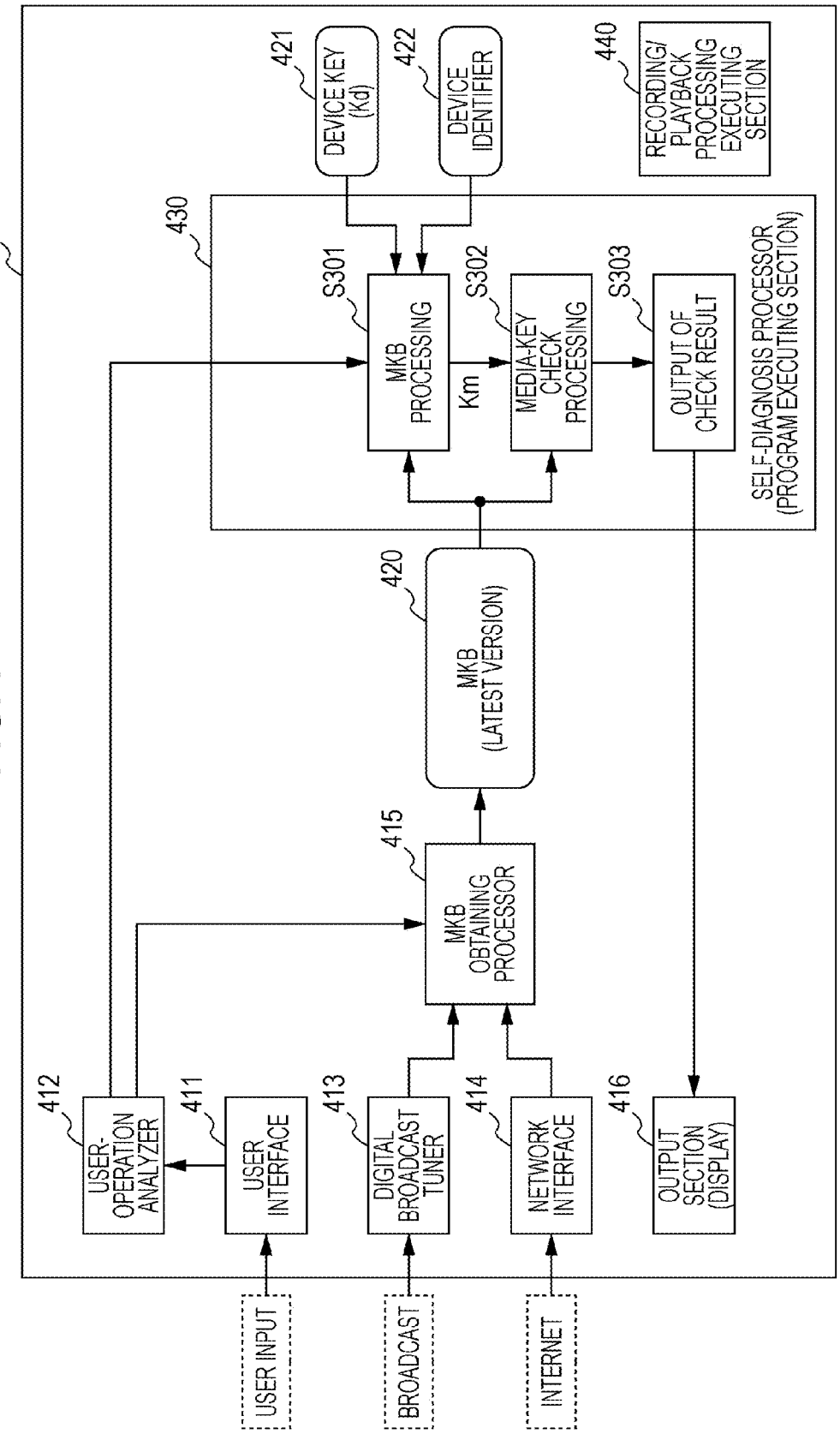
FIG. 7 is a diagram illustrating apparatus-unique-key validity check processing and result notification processing which are executed by an information processing apparatus according to a third embodiment of the present invention.

Next, a third embodiment of the apparatus-unique-key validity check processing and the result notification processing will be described with reference to FIG. 7. FIG. 7 is a diagram illustrating the configuration of an information processing apparatus according to a third embodiment of the present invention.

As in the first embodiment described above, an information processing apparatus 410 shown in FIG. 7 also executes content playback or recording processing using a medium, such as a DVD or a Blu-ray Disc®. The content playback and recording processing using a medium is performed by a recording/playback processing executing section 440 in the same manner as the processing described above with reference to FIG. 1.

As in the first embodiment described above, in the third embodiment, MKB processing using a device key (Kd), which is an apparatus-unique key, is actually executed to check whether the device key (Kd) is valid or invalidated. In the third embodiment, however, only MKB data is externally received, unlike the first embodiment. That is, the information processing apparatus 410 pre-stores the diagnostic program in its memory and uses and executes the program therein without externally receiving it.

The information processing apparatus 410 shown in FIG. 7 holds a device key (Kd) 421 as an apparatus-unique key and further holds, in the memory, a device identifier (device number) 422, which is a unique identifier of the device key (Kd) 421 held in the apparatus.

The information processing apparatus 410 shown in FIG. 7 receives data through broadcast waves and a digital broadcast tuner 413 or through a network (such as the Internet) and a network interface 414, and an MKB obtaining processor 415 in the information processing apparatus 410 obtains an MKB (latest version) 420, which is the latest version of the MKB, from the received data. The MKB is transmitted, for example, as part of an update program in typical digital broadcast. In this embodiment, however, the information processing apparatus 410 does not receive a diagnostic program for determining the validity of the device key (Kd) 421, which is an apparatus-unique key. That is, the information processing apparatus 410 receives only the latest MKB. For example, the manufacturer of the information processing apparatus receives the latest version of the MKB from the administration center and supplies the received latest MKB to the user information processing apparatus.

The user gives an instruction via a user interface 411 at an arbitrary time so as to execute the diagnostic program for the apparatus-unique key. The user instruction information input via the user interface 411 is analyzed by a user-operation analyzer 412. The diagnostic program is started in accordance with a result of the analysis. The diagnostic program is pre-stored in the information processing apparatus 410.

The diagnostic program is executed by a self-diagnosis processor (a program executing section) 430 shown in FIG. 7. Processing performed by the self-diagnosis processor (program executing section) 430 will now be described.

First, in step S301, the self-diagnosis processor (program executing section) 430 executes MKB processing. In the MKB processing in step S301, the device key (Kd) 421 (which is an apparatus-unique key of the information processing apparatus 410) and the device identifier (device number) 422 are used to perform processing for obtaining a media key (Km) from the received MKB (latest version) 420.

As described above, when a valid device key (Kd) is used, a valid media key (Km) can be obtained from the MKB. However, when an invalidated (revoked) device key (Kd) is used, a valid media key (Km) may not be obtained from the MKB.

Next, in step S302, media-key check processing is executed. In this processing, it is checked whether the media key (Km) obtained in the processing performed on the MKB 420 has a valid value or an invalid value. When top 64 bits of a calculation value of a function AES-E (Km, Dv) using the media key (Km) and the media-key verification value (Dv) is equal to a hexadecimal value "0123456789ABCDEF", it is determined that the media key (Km) has a valid value.

Next, in step S303, processing for outputting a result of the check is performed. In this processing, a result corresponding to the validity/invalidity of the device key (Kd) is output on an output section (a display) 416. For example, when a correct media key is obtained with success, a message indicating that the device key (Kd) is valid is output. For example, when acquirement of a correct media key fails, a message indicating that the device key (Kd) is invalidated is output. As a result of this processing, the user can check whether the apparatus-unique key (i.e., the device key (Kd) 421) stored in the information processing apparatus 410 is valid or invalidated.

Since the information processing apparatus 410 does not have to receive a diagnostic program in this processing example, the amount of data transmitted/received is reduced and the amount of processing of the information processing apparatus 410 is reduced. In addition, since the device key (Kd) that necessitates confidentiality and integrity does not have to be directly handled by the updatable diagnostic program and is instead handled by a program already installed on the product (i.e., the information processing apparatus 410), there is also an advantage in that it is easy to maintain robustness in security implementation for confidentiality and integrity of the device key (Kd). In addition, the capability of the invalidity checking without using a medium on which the latest MKB is recorded is also a feature that is common to the other embodiments.

The sequence of the apparatus-unique-key validity check processing executed by the self-diagnosis processor 430 in the third embodiment is analogous to the sequence of the processing described above in the first embodiment and shown in the flowchart of FIG. 4.

[(2-4) Fourth Embodiment of Apparatus-Unique-Key Validity Check Processing and Result Notification Processing]

Figure 8:
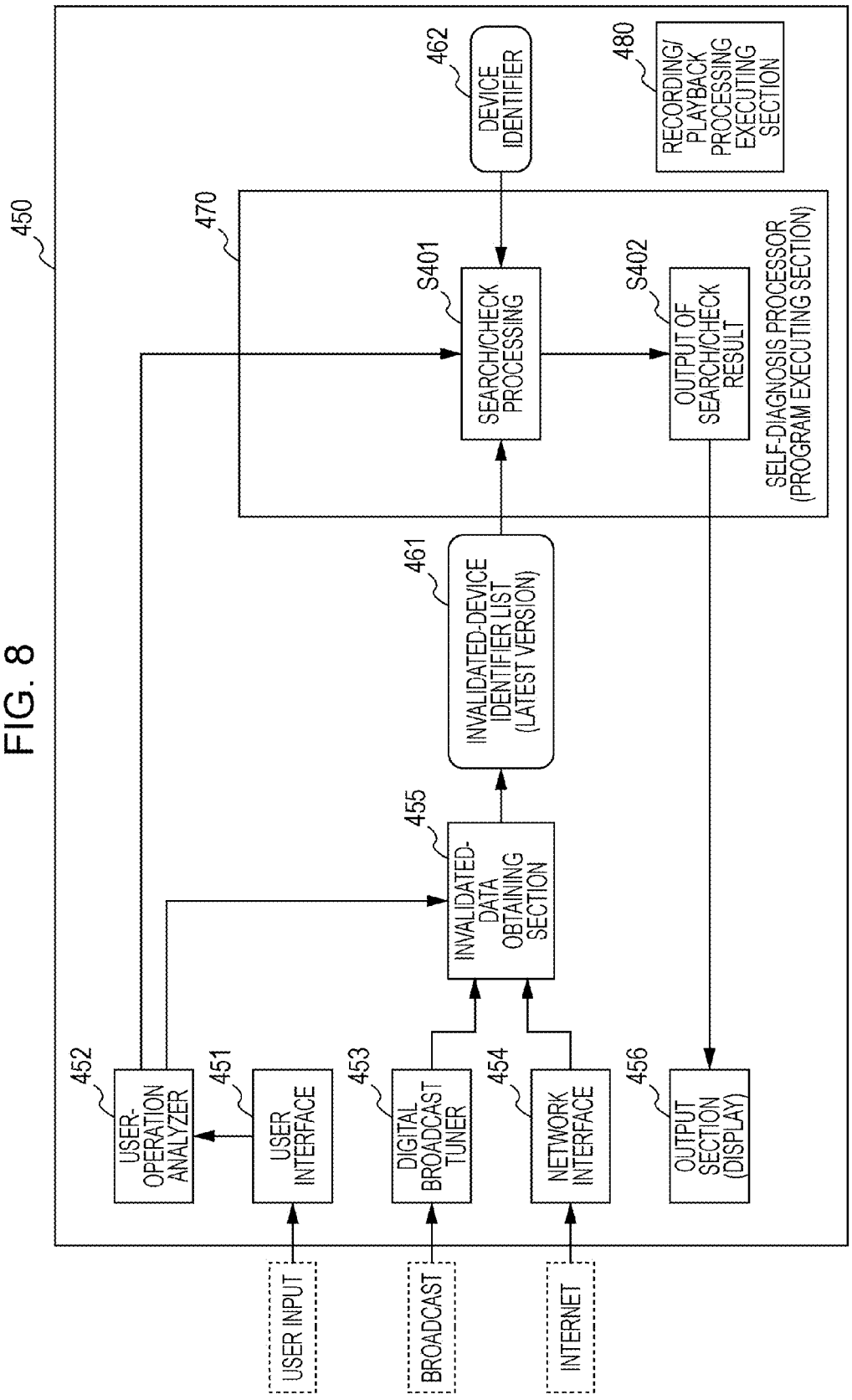
FIG. 8 is a diagram illustrating apparatus-unique-key validity check processing and result notification processing which are executed by an information processing apparatus according to a fourth embodiment of the present invention.

Next, a fourth embodiment of the apparatus-unique-key validity check processing and the result notification processing will be described with reference to FIG. 8. FIG. 8 is a diagram illustrating the configuration of an information processing apparatus according to a fourth embodiment of the present invention.

As in the first embodiment described above, an information processing apparatus 450 shown in FIG. 8 also executes content playback or recording processing using a medium, such as a DVD or a Blu-ray Disc®. The content playback and recording processing using a medium is performed by a recording/playback processing executing section 480 in the same manner as the processing described above with reference to FIG. 1.

As in the second embodiment described above, in the fourth embodiment, without actually performing MKB processing, processing for checking whether or not the device key (Kd), which is an apparatus-unique key, is valid is performed through processing for comparison with an invalidated-device identifier list.

In the fourth embodiment, however, only the invalidated-device identifier list is externally received, unlike the second embodiment. That is, the information processing apparatus 450 pre-stores a diagnostic program in its memory. Thus, without externally receiving a diagnostic program, the information processing apparatus 450 uses the program pre-stored therein to execute apparatus-unique-key validity check processing.

The information processing apparatus 450 shown in FIG. 8 holds a device key (Kd), not shown, in its memory as an apparatus-unique key. The information processing apparatus 450 further holds, in the memory, a device identifier (device number) 462 that is a unique identifier of the device key (Kd) held in the apparatus.

As in the second embodiment described above with reference to FIG. 5, the information processing apparatus 450 shown in FIG. 8 receives an invalidated-device identifier list, used to determine the validity of the device key (Kd) (which is a apparatus-unique key), through broadcast waves and a digital broadcast tuner 453 or through a network (such as the Internet) and a network interface 454. An invalidated-data obtaining section 455 shown in FIG. 8 obtains an invalidated-device identifier list 461 from received data.

In this embodiment, however, the information processing apparatus 450 does not receive a diagnostic program for determining the validity of the device key (Kd), which is an apparatus-unique key. The information processing apparatus 450 receives only the latest invalidated-device identifier list 461. For example, the manufacturer of the information processing apparatus receives the latest version of the invalidated-device identifier list from the administration center and supplies the received latest invalidated-device identifier list to the user information processing apparatus.

The user gives an instruction via a user interface 451 at an arbitrary time so as to execute the diagnostic program for the apparatus-unique key. The user instruction information input via the user interface 451 is analyzed by a user-operation analyzer 452. The diagnostic program is started in accordance with a result of the analysis.

The diagnostic program is executed by a self-diagnosis processor (a program executing section) 470 shown in FIG. 8. Processing performed by the self-diagnosis processor (program executing section) 470 will now be described.

First, the self-diagnosis processor (program executing section) 470 executes search/check processing in step S401. In this processing, check processing is executed to check whether or not the device identifier (device number) 462 of the information processing apparatus 450 is recorded in the externally received latest invalidated-device identifier list 461.

When the device identifier (device number) 462 is not recorded in the invalidated-device identifier list 461, it is determined that the device key (Kd), which is an apparatus-unique key, held in the information processing apparatus 450 is valid. In this case, in search/check-result output processing in step S402, a message indicating that the device key (Kd) is valid is output on an output section (a display) 456.

On the other hand, when the device identifier (device number) 462 is recorded in the invalidated-device identifier list 461, it is determined that the device key (Kd), which is an apparatus-unique key, held in the information processing apparatus 450 is invalidated. In this case, a message indicating that the device key (Kd) is invalidated is output to the output section (display) 456. As a result of this processing, the user can check whether the apparatus-unique key (the device key (Kd)) stored in the information processing apparatus 450 is valid or invalidated.

Since the information processing apparatus 450 does not have to receive the diagnostic program in this processing example, the amount of data transmitted/received is reduced and the amount of processing of the information processing apparatus 450 is reduced. In addition, since the device key (Kd) that necessitates confidentiality and integrity does not have to be directly handled by the updatable diagnostic program, there is also an advantage in that robustness in security implementation for confidentiality and integrity of the device key (Kd) is not affected. In addition, the capability of the invalidity checking without using a medium on which the latest MKB is recorded is also a feature that is common to the other embodiments.

The sequence of the apparatus-unique-key validity check processing executed by the self-diagnosis processor 470 in the fourth embodiment is analogous to the sequence of the processing described above in the second embodiment and shown in the flowchart of FIG. 6.

[(2-5) Fifth Embodiment of Apparatus-Unique-Key Validity Check Processing and Result Notification Processing]

A configuration example using a recording/playback apparatus, such as a PC, to which a drive apparatus is connected will now be described as a fifth example of the apparatus-unique-key validity check processing and the result notification processing.

Figure 9:
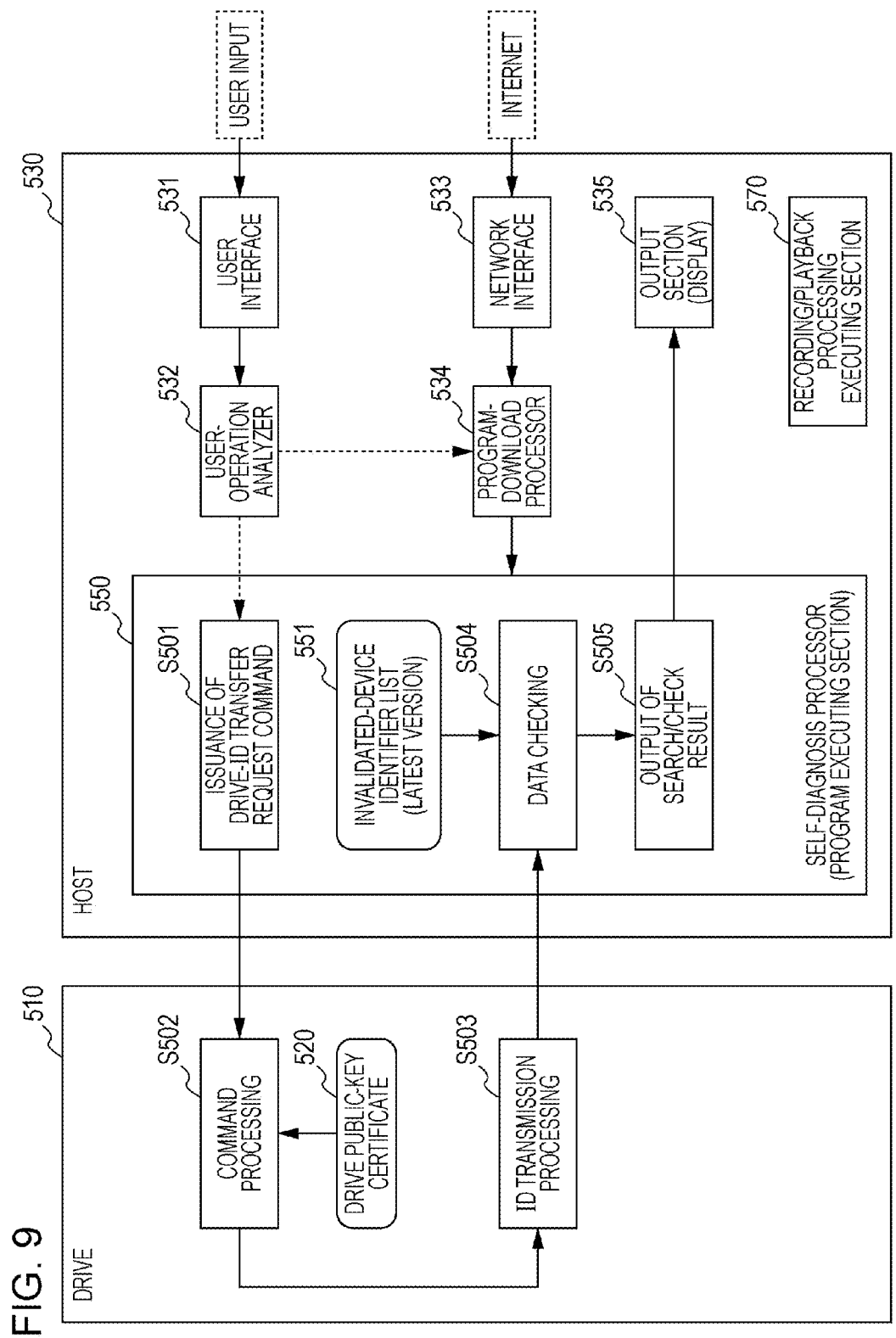
FIG. 9 is a diagram illustrating apparatus-unique-key validity check processing and result notification processing which are executed by an information processing apparatus according to a fifth embodiment of the present invention.

FIG. 9 shows a drive 510 and a host 530. A medium (an information storage medium), such as a DVD or a Blu-ray Disc®, is loaded into the drive 510. Through data transfer with the drive 510, the host 530 plays back data from the medium or records data to the medium. For example, the host 530 corresponds to an apparatus, such as a PC.

In the example shown in FIG. 9, a recording/playback processing executing section 570 in the host 530 executes processing for playing back content from the medium and recording content to the medium, in the same manner as the processing described above with reference to FIG. 2. Although not shown in FIG. 9, the host 530 holds a device key (Kd) as an apparatus-unique key and uses the device key (Kd) to play back or record content. Validity check processing of the device key (Kd) held in the host 530 is performed in the same manner as the processing of one of the first to fourth embodiments described above.

In the fifth embodiment, the drive 510 is an apparatus that is independent from the host 530. Thus, validity check of the apparatus-unique key held in the drive 510 is performed. The apparatus-unique key held in the drive 510 is a drive public key given to the drive 510.

The drive public key is stored in a drive public-key certificate 520 shown in FIG. 9. The drive 510 stores the drive public-key certificate 520 in a memory in the drive 510. The drive public-key certificate 520 is issued by a public-key issuing center. The drive public-key certificate 520 has a signature of the public-key issuing center and has a structure that makes tampering difficult. In this example, the public-key issuing center may be the administration center (AACS LA).

FIG. 10 shows the data structure of the drive public-key certificate 520 according to the AACS. As shown in FIG. 10, data of a certificate type, a data length, a drive ID, a drive public key, and a signature are recorded in the drive public-key certificate. The signature is signed using a public key of the AACS administration center. After the legitimacy of the drive public-key certificate 520 is checked through signature verification using the public key of the AACS administration center, the stored data is used.

The data is used in the host-drive authentication and key-sharing processing (steps S51 and S61) described above with reference to FIG. 2. In the authentication and key-sharing processing, an authentication and key-sharing processing sequence specified by the AACS is executed. In this processing, the host checks the legitimacy of the drive. That is, the host checks whether or not the drive has a valid public key. The host also holds a host public-key certificate having a similar data structure and the drive checks the legitimacy of the host. After the checking, content playback or recording is executed.

As described above with reference to FIG. 2, the validity of the public key can be checked with reference to a revocation list. For example, the host refers to a drive revocation list to check whether or not the identifier (the drive ID shown in FIG. 10) of the drive public key held in the drive is recorded in the drive revocation list. When the identifier (the drive ID) of the drive public key held in the drive is recorded in the drive revocation list, this means that the public-key certificate of the drive has been invalidated. In this case, the host does not execute processing using the drive, i.e., does not execute content recording/playback.

The host-drive authentication and key-sharing processing is performed as preprocessing for content recording/playback. Thus, when the drive or host public-key certificate has been invalidated, the processing is terminated halfway even when the user attempts to perform content recording/playback processing. This may leads to the user's false perception that a failure occurred in the apparatus.

The revocation list is sequentially updated. Unless the latest revocation list is used, content recording/playback is permitted, and only when the latest revocation list is obtained and used, an event subsequent content recording/playback is disabled occurs. It is difficult for typical users to correctly determine the cause of such an event, because of the difficulty of knowing when the latest revocation list is applied. Thus, in many cases, the users determine that the apparatus is broken.

Accordingly, the present invention makes it possible to check the validity of the drive public-key certificate (which contains the apparatus-unique key of the drive) in accordance with a sequence that is independent from the content playback/recording processing. Specifically, this arrangement allows the user to give an instruction to check the validity of the apparatus-unique key, i.e., the public-key of the drive in this example.

A self-diagnosis processor 550 in the host 530 shown in FIG. 9 executes validity check processing for the public key of the drive. The self-diagnostic program 550 for the validity check processing is supplied from, for example, the apparatus manufacturer. The host 530 receives the diagnostic program, supplied from a service site of the apparatus manufacturer, through a network (such as the Internet) and a network interface 533.

The received program is subjected to download processing by a program download-processor 534 and is stored in a memory in the host 530. The self-diagnosis processor 550 executes the downloaded diagnostic program. The downloaded diagnostic program contains an invalidated device identifier (drive ID) list 551. This list 551 is the latest version available at the time of the download processing. For example, the manufacturer of the information processing apparatus, which serves as the drive or the host, receives the latest version of the invalidated-device identifier (drive ID) list 551 from the administration center and supplies a program containing the received latest list 551 to the user information processing apparatus.

Identification information of public keys held in apparatuses to which invalidated public keys (public key certificates) are issued, specifically, the drive IDs in this example, is recorded in the invalidated-device identifier list 551. The drive ID corresponds to the drive ID (see FIG. 10) recorded in the public-key certificate. The self-diagnosis processor 550 receives the drive ID, recorded in the drive public-key certificate 520, from the drive 510, and executes processing for comparing the drive ID with the downloaded invalidated-device identifier list 551 to check the validity of the drive public-key certificate 520.

The apparatus-unique-key validity check processing executed by the host 530 will now be described with reference to FIG. 9. In this example, the apparatus-unique-key validity check processing is performed as processing for checking the validity of the drive public-key certificate 520.

The user gives an instruction via a user interface 531 at an arbitrary time so as to execute the diagnostic program for the apparatus-unique key. The user instruction information input via the user interface 531 is analyzed by a user-operation analyzer 532. In accordance with a result of the analysis, the self-diagnosis processor (program executing section) 550 starts the diagnostic program.

The self-diagnosis processor (program executing section) 550 shown in FIG. 9 executes the diagnostic program in the order of processing steps S501 to 5505 as processing that involves communication with the drive. This processing involves processing for comparison with the invalidated-device identifier list (latest version) 551 contained in the externally downloaded diagnostic program.

First, in step S501, the self-diagnosis processor (program executing section) 550 issues a drive-ID transfer request command to the drive 510. In step S502, the drive 510 executes processing on the received command. The drive 510 interprets the command received from the host 530, obtains the drive public-key certificate 520 (see FIG. 10) stored in the memory in the drive 510, and reads the drive ID recorded in the drive public-key certificate 520. In step S503, the drive 510 outputs the read drive ID to the host 530.

In step S504, the self-diagnosis processor (program executing section) 550 in the host 530 executes processing for comparing the drive ID received from the drive 510 with the invalidated-device identifier list (latest version) 551 contained in the externally downloaded diagnostic program.

When the device identifier (drive ID) received from the drive 510 is not recorded in the invalidated-device identifier list 551, it is determined that the public-key certificate containing the public key (which is an apparatus-unique key) held in the drive 510 is valid. In this case, in step S505, search/check-result output processing is performed, so that a message indicating that the drive public-key certificate 520 containing the drive public key is valid is output on an output section (a display) 535.

On the other hand, when the device identifier (drive ID) received from the drive 510 is recorded in the invalidated-device identifier list 551, it is determined that the public-key certificate containing the public key (which is an apparatus-unique key) held in the drive 510 is invalid. In this case, in the search/check-result output processing in step S505, a message indicating that the drive public-key certificate 520 containing the drive public key is invalid is output to the output section (display) 535. As a result of this processing, the user can check whether the apparatus-unique key (the public key contained in the drive public-key certificate 520) stored in the drive 510 is valid or invalidated.

Figure 11:
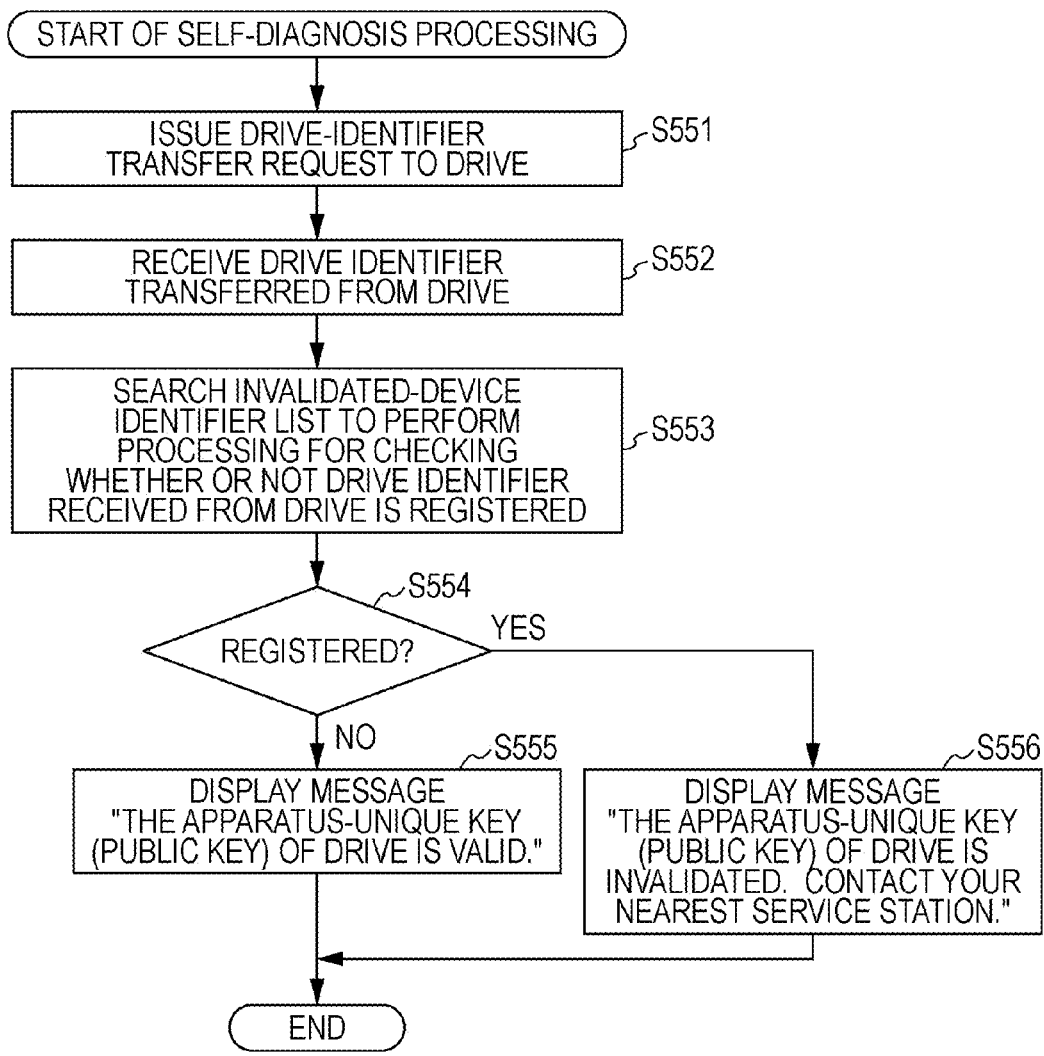
FIG. 11 is a flowchart illustrating a sequence of the apparatus-unique-key validity check processing and the result notification processing which are executed by the information processing apparatus according to the fifth embodiment of the present invention.

FIG. 11 is a flowchart illustrating a sequence of the validity check processing for the apparatus-unique key (the public key contained in the drive public-key certificate 520), the validity check processing being executed by the self-diagnosis processor 550 in the host 530 (which serves as the information processing apparatus) shown in FIG. 9.

First, in step S551, the self-diagnosis processor 550 in the host 530 issues a drive-ID transfer request to the drive 510.

Next, in step S552, the host 530 receives the drive ID transferred from the drive 510.

Next, in step S553, the host 530 executes processing for checking whether or not the drive ID received from the drive 510 is registered in the externally received invalidated-device identifier list.

In step S554, when it is determined that the drive ID is not registered in the invalidated-device identifier list, the process proceeds to step S555 in which a message "The apparatus-unique key (public key) of the drive is valid." is displayed and output via the output section (display) 535.

On the other hand, when it is determined in step S554 that the drive ID is registered in the invalidated-device identifier list, the process proceeds to step S556 in which a message "The apparatus-unique key (public key) of the drive is invalidated." or the like is displayed and output via the output section (display) 535.

As a result of this processing, the user can check whether the apparatus-unique key (the public key contained in the public-key certificate) stored in the drive 510 is valid or invalidated, without dependence on a combination with a host or a medium on which the latest drive revocation list (DRL) is recorded.

[(2-6) Sixth Embodiment of Apparatus-Unique-Key Validity Check Processing and Result Notification Processing]

Another embodiment of the apparatus-unique-key validity check processing and the result notification processing in a configuration using a recording/playback apparatus, such as a PC, to which a drive apparatus is connected will now be described as a sixth embodiment with reference to FIG. 12.

Figure 12:
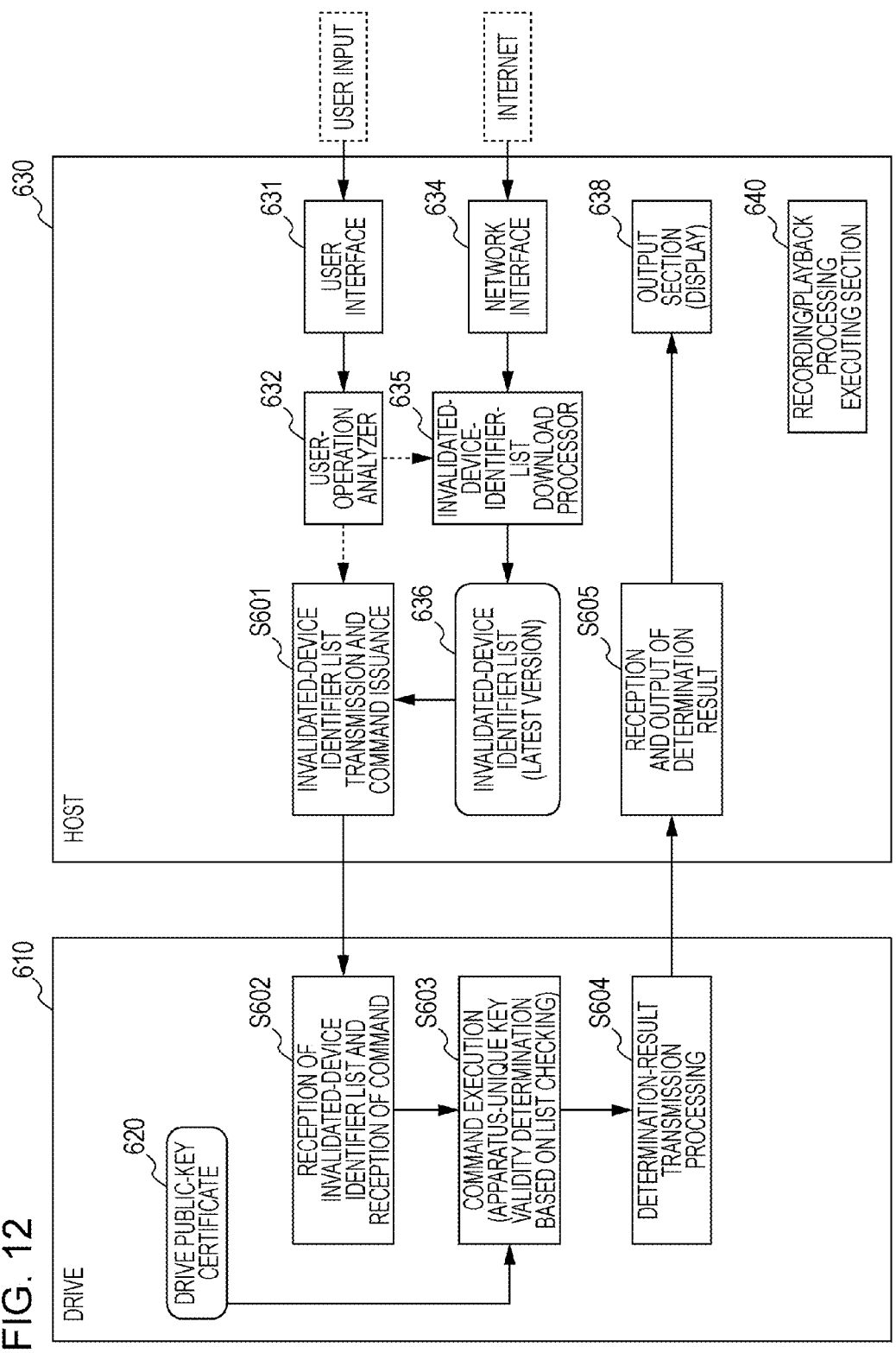
FIG. 12 is a diagram illustrating apparatus-unique-key validity check processing and result notification processing which are executed by an information processing apparatus according to a sixth embodiment of the present invention.

FIG. 12 shows a drive 610 and a host 630 which are similar to those shown in FIG. 9. A medium (an information storage medium), such as a DVD or a Blu-ray Disc®, is loaded into the drive 610. Through data transfer with the drive 610, the host 630 plays back data from the medium or records data to the medium. For example, the host 630 corresponds to an apparatus, such as a PC.

In the example shown in FIG. 12, a recording/playback processing executing section 640 in the host 630 executes processing for playing back content from the medium and recording content to the medium, in the same manner as the processing described above with reference to FIG. 2. Although not shown in FIG. 12, the host 630 holds a device key (Kd) as an apparatus-unique key and uses the device key (Kd) to play back or record content. Validity check processing of the device key (Kd) held in the host 630 is performed in the same manner as the processing of one of the first to fourth embodiments described above.

In the sixth embodiment, it is checked whether or not the identifier of a key held in the drive 610 is registered in the invalidated-device identifier list, as in the fifth embodiment. On the basis of a result of the checking, a determination is made as to whether or not the apparatus-unique key of the drive 610 is valid. In this example, the apparatus-unique key of the drive 610 is also a drive public key contained in the drive public-key certificate held in the drive.

In the sixth embodiment, however, only the invalidated-device identifier list is externally received, unlike the fifth embodiment. That is, the host 630 and the drive 610, which serve as information processing apparatuses, pre-store diagnostic programs in their respective memories. Thus, without externally receiving a diagnostic program, the host 630 and the drive 610 execute the apparatus-unique-key (drive public key) validity check processing by using the pre-stored programs.

The invalidated-device identifier list is supplied from, for example, the apparatus manufacturer. The host 630 receives the invalidated-device identifier list, supplied from a service site of the apparatus manufacturer, through a network (such as the Internet) and a network interface 634.

The received invalidated-device identifier list is subjected to download processing by an invalidated-device-identifier-list download processor 635 and is stored in the memory in the host 630. Identification information of public keys (public key certificates) held in invalidated apparatuses, specifically, drive IDs in this example, is recorded in the invalidated-device identifier list. The drive ID corresponds to the drive ID (see FIG. 10) recorded in the public-key certificate.

The apparatus-unique-key validity check processing executed by the host 630 will now be described with reference to FIG. 12. In this example, the apparatus-unique-key validity check processing is performed as processing for checking the validity of a drive public-key certificate 620.

The user gives an instruction via a user interface 631 at an arbitrary time so as to execute the diagnostic program for the apparatus-unique key. The user instruction information input via the user interface 631 is analyzed by a user-operation analyzer 632. In accordance with a result of the analysis, the diagnostic program stored in the memory in the host 630 is started, so that the processing in steps S601 to 5605 is executed.

This series of processing involves processing for comparison with an externally downloaded invalidated-device identifier list (latest version) 636. In the embodiment, however, the processing for comparison with the list is executed by the drive 610. That is, the validity determination for the apparatus-unique key of the drive is executed by the drive 610. The drive 610 outputs a result of the determination to the host 630. The host 630 receives the determination result from the drive 610 and outputs the determination result on an output section (a display) 638.

First, in step S601, the host 630 outputs the externally downloaded invalidated-device identifier list (latest version) 636, together with an execution instruction command for the apparatus-unique-key validity check processing, to the drive 610.

Next, in step S602, the drive 610 receives the invalidated-device identifier list (latest version) 636, together with the command, from the host 630.

In step S603, the drive 610 executes processing on the command received from the host 630. The drive 610 first obtains the drive public-key certificate 620 (see FIG. 10) stored in its memory and reads the drive ID recorded in the drive public-key certificate 620. Next, the drive 610 executes processing for comparing the drive ID read from the drive public-key certificate 620 with the invalidated-device identifier list (latest version) 636 received from the host 630.

When the drive ID read from the drive public-key certificate 620 is not recorded in the invalidated-device identifier list (latest version) 636, it is determined that the public-key certificate containing the drive public key, which is an apparatus-unique key, held in the drive 610 is valid. In this case, in step S604, determination-result transmission processing is performed, so that a determination result indicating that the drive public-key certificate 620 containing the drive public key, which is an apparatus-unique key, is valid is output to the host 630. In step S605, the host 630 outputs, to the output section (display) 638, a message indicating that the drive public-key certificate 620 is valid.

On the other hand, when the drive ID read from the drive public-key certificate 620 is recorded in the invalidated-device identifier list (latest version) 636, it is determined that the public-key certificate containing the drive public key, which is an apparatus-unique key, held in the drive 610 is invalid. In this case, in the determination-result transmission processing in step S604, a determination result indicating that the drive public-key certificate 620 containing the drive public key, which is an apparatus-unique key, is invalid is output to the host 630. In step S605, the host 630 outputs, to the output section (display) 638, a message indicating that the drive public-key certificate 620 is invalid.

As a result of this processing, the user can check whether the apparatus-unique key (the drive public key contained in the drive public-key certificate 620) stored in the drive 610 is valid or invalidated, without dependence on a combination with a host or a medium on which the latest drive revocation list (DRL) is recorded.

[3. Functions and Configuration of Information Processing Apparatus]

The functions and the configuration of an information processing apparatus that executes processing for the above-described embodiments will be collectively described next with reference to FIGS. 13 and 14.

Figure 13:
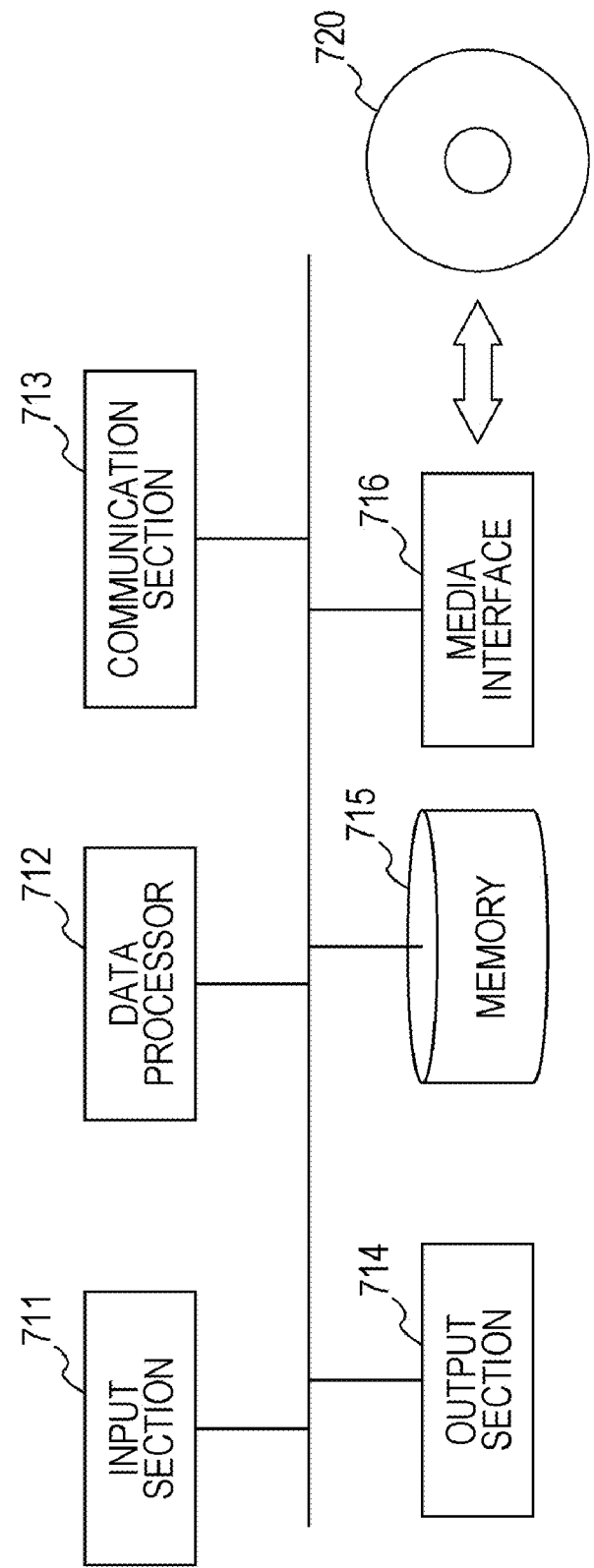
FIG. 13 is a block diagram illustrating the configuration of an information processing apparatus that executes processing according to the embodiments of the present invention.

FIG. 13 is a diagram of an information processing apparatus corresponding to a recording playback apparatus into which a drive apparatus is integrated. This information processing apparatus corresponds to the information processing apparatus for performing processing in the first to fourth embodiments described above.

As shown in FIG. 13, this information processing apparatus has an input section 711, a data processor 712, a communication section 713, an output section 714, a memory 715, and a media interface 716. The information processing apparatus shown in FIG. 13 records data to a medium 720 or plays back data from the medium 720 via the media interface 716. The medium 720 is, for example, a DVD or a Blu-ray Disc®.

The input section 711 inputs user operation information. The communication section 713 is implemented by, for example, a digital broadcast tuner and/or a network interface. The communication section 713 receives key-validity determination data for determining whether an apparatus-unique key is valid or invalid. The key-validity determination data contains, for example, a diagnostic program, a media key block (MKB), and an invalidated-device identifier list, which is an identification-information list of information processing apparatuses in which invalidated apparatus-unique keys are stored.

Examples of information stored in the memory 715 include a device key (Kd) serving as an apparatus-unique key, a device identifier (device number), a latest media key block (MKB) to be recognized by the apparatus, data received via the communication section 713, a program, and so on.

The data processor 712 executes content recording/playback processing, control for processing for data reception via the communication section 713, and apparatus-unique-key validity check processing. The data processor 712 executes, for example, processing of the self-diagnosis processor and processing of the recording/playback executing section described above in the first to fourth embodiments.

More specifically, the data processor 712 executes apparatus-unique-key validity check processing using the diagnostic program received via the communication section 713, the media key block (MKB), the invalidated-device identifier list, and so on and outputs a result of the determination to the output section 714.

Figure 14:
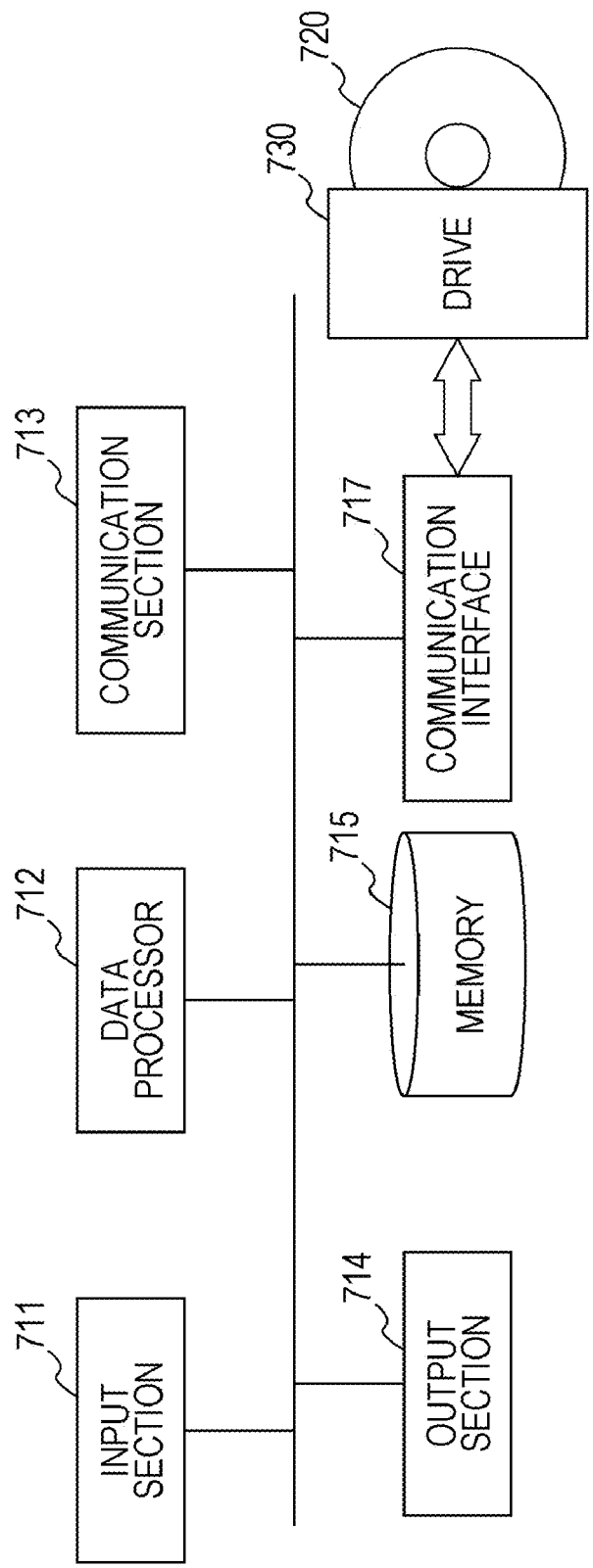
FIG. 14 is a block diagram illustrating the configuration of another information processing apparatus that executes processing according to the embodiments of the present invention.

FIG. 14 is a diagram showing a configuration example of an information processing apparatus from which a drive apparatus is independent. This information processing apparatus corresponds to the information processing apparatus for performing processing in the fifth and sixth embodiments described above.

As shown in FIG. 14, this information processing apparatus has an input section 711, a data processor 712, a communication section 713, an output section 714, a memory 715, and a communication interface 717 for communication with a drive 730. The information processing apparatus shown in FIG. 14 communicates with the drive 730 via the communication interface 717 to record data to a medium 720 or play back data from the medium 720. The medium 720 is, for example, a DVD or a Blu-ray Disc®.

The configurations of the input section 711, the data processor 712, the communication section 713, the output section 714, and the memory 715 are substantially the same as those described above with reference to FIG. 13. The drive revocation list (DRL) is also stored in the memory 715. An AACS-administration-center public key and a set of a drive private key and a drive public-key certificate are stored in the drive 730. The data processor 712 executes content recording/playback processing, control for processing for data reception via the communication section 713, and apparatus-unique-key validity check processing. The data processor 712 executes, for example, processing of the self-diagnosis processor and processing of the recording/playback executing section described above in the fifth and sixth embodiments.

More specifically, the data processor 712 executes apparatus-unique-key validity check processing using the diagnostic program received via the communication section 713, the media key block (MKB), the invalidated-device identifier list, and so on and outputs a result of the determination to the output section 714.

The data processor 712 executes communication with the drive 730 via the communication interface 717, executes apparatus-unique-key validity check processing using a result obtained by comparing the drive ID (which is the identifier of a key held in the drive apparatus) with the invalidated-device identifier list (which is key-validity determination data), and outputs a result of the determination to the output section 714.

The present invention has been detailed above in conjunction with the particular embodiments. It is apparent to those skilled in the art that modifications and substitutions can be made to the embodiments without departing from the scope and spirit of the present invention. That is, the present invention has been disclosed above by way of example and thus should not be construed as limiting. The claims of the present invention should also be taken into account in order to determine the scope and spirit of the present invention.

The series of processing described herein can be executed by hardware, software, or a combination thereof. When the series of processing is to be executed by software, a program in which the processing sequence is written can be executed through installation into a memory in a computer incorporated in dedicated hardware or through installation onto a general-purpose computer that is capable of executing various types of processing. For example, the program can be pre-recorded on a storage medium. The program may be installed from the storage medium onto a computer. Alternatively, the program can be installed on a built-in storage medium, such as a hard disk, through reception of the program over a network, such as a LAN (local area network) or the Internet.

The various types of processing described herein may not only be time-sequentially executed according to the above-described sequence but may also be executed in parallel or individually depending on a processing capability of an apparatus that executes the processing or depending on the necessity. The term "system" as used herein refers to a logical collection of multiple apparatuses and is not limited to an architecture in which apparatuses having individual configurations are provided in a single housing.

The present application contains subject matter related to that disclosed in Japanese Priority Patent Application JP 2009-024053 filed in the Japan Patent Office on Feb. 4, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content recording playback processing apparatus comprising:
    a memory configured to store an apparatus-unique key, the apparatus-unique key being a key that is unique to the content recording playback processing apparatus;
    an input section configured to input user operation information;
    a communication section configured to perform data reception processing;
    a data processor configured to execute validity determination processing for the apparatus-unique key; and
    an output section configured to input a result of the validity determination processing executed by the data processor, wherein the data processor is further configured to:
        receive, via the communication section, key-validity determination data for determining whether the apparatus-unique key is valid or invalid,
        execute the apparatus-unique-key validity determination processing by using the key-validity determination data in response to a user instruction input via the input section, and
        output a result of the validity determination processing to the output section, wherein:
    the apparatus-unique key comprises a device key configured to obtain a media key from a media key block in which the media key is stored, the media key configured for cryptography processing during playback of content from a medium or during recording of content to the medium:
    the key-validity determination data comprises the media key block, wherein the media key block is configured to have a structure that permits a valid media key to be obtained only when a valid device key is used; and
    the data processor is configured to execute processing on the media key block by using the device key stored in the memory in the content recording playback processing apparatus and to perform validity determination on the device key at least in part based on processing for checking whether or not a valid media key is obtained.

2. The content recording playback processing apparatus according to claim 1, wherein:
    the key-validity determination data comprises a diagnostic program for determining whether the apparatus-unique key is valid or invalid, and
    the data processor is configured to execute the diagnostic program to perform the apparatus-unique-key validity determination processing.

3. The content recording playback processing apparatus according to claim 1, wherein:
    the key-validity determination data comprises an invalidated-device identifier list that is an identification information list of content recording playback processing apparatuses in which invalidated apparatus-unique keys are stored, and the data processor is configured to execute processing for comparing a device identifier of the content recording playback processing apparatus with the invalidated-device identifier list and to perform the apparatus-unique-key validity determination processing at least in part based on processing for checking whether or not the device identifier of the content recording playback processing apparatus is registered in the invalidated-device identifier list.

4. The content recording playback processing apparatus according to claim 1, wherein the output section is configured to display information indicating the result of the validity determination processing.

5. A content recording playback processing apparatus comprising:
   an input section configured to input user operation information;
   a communication section configured to perform data reception processing;
   a communication interface configured to communicate with a drive apparatus, connected to the content recording playback processing apparatus, that records data to a medium or plays back data from the medium;
   a data processor configured to execute validity determination processing for an apparatus-unique key that is a key unique to the drive apparatus, wherein the apparatus-unique key is a drive public key issued to the drive apparatus; and
   an output section configured to output a result of the validity determination processing executed by the data processor, wherein the data processor is further configured to:
      receive, via the communication section, key-validity determination data for determining whether the apparatus-unique key is valid or invalid,
      execute communication with the drive apparatus in response to a user instruction input via the input section,
      execute the apparatus-unique-key validity determination processing at least in part based on a result obtained by comparing a drive identifier with the key-validity determination data, the drive identifier being an identifier of a key held in the drive apparatus, and
      output a result of the validity determination processing to the output section, wherein:
   the key-validity determination data comprises an invalidated-device identifier list that is an identification-information list of content recording playback processing apparatuses in which invalidated apparatus-unique keys are stored; and
   the data processor is configured to issue, to the drive apparatus, a request for obtaining the drive identifier recorded in a drive-public key certificate comprising the drive public key and to perform the apparatus-unique-key validity determination processing at least in part based on processing for checking whether or not the obtained drive identifier is registered in the invalidated-device identifier list.

6. The content recording playback processing apparatus according to claim 5, wherein the key-validity determination data comprises an invalidated-device identifier list that is an identification-information list of content recording playback processing apparatuses in which invalidated apparatus-unique keys are stored; and
   the data processor is configured to output, to the drive apparatus, the invalidated-device identifier list and a request command for comparing the drive identifier recorded in a drive-public key certificate comprising the drive public key and to perform the apparatus-unique-key validity determination processing at least in part based on a result obtained by the comparison and input from the drive apparatus.

7. An information processing method to be executed by a content recording playback processing apparatus, the information processing method comprising:
   causing a data processor to receive, via a communication section, key-validity determination data for determining whether an apparatus-unique key that is a key unique to the content recording playback processing apparatus is valid or invalid;
   causing the data processor to execute validity determination processing for the apparatus-unique key by using the key-validity determination data in response to a user instruction input via an input section; and
   causing the data processor to output a result of the validity determination processing to an output section,
   wherein:
   the apparatus-unique key comprises a device key configured to obtain a media key from a media key block in which the media key is stored, the media key configured for cryptography processing during playback of content from a medium or during recording of content to the medium;
   the key-validity determination data comprises the media key block, wherein the media key block is configured to have a structure that permits a valid media key to be obtained only when a valid device key is used; and
   the data processor is configured to execute processing on the media key block by using the device key stored in the memory in the content recording playback processing apparatus and to perform validity determination on the device key at least in part based on processing for checking whether or not a valid media key is obtained.

8. The information processing method according to claim 7, further comprising:
   causing the output section to display information indicating the result of the validity determination processing.

9. An information processing method to be executed by a content recording playback processing apparatus, the information processing method comprising:
   causing a data processor to receive, via a communication section, key-validity determination data for determining whether an apparatus-unique key that is a key unique to a drive apparatus connected to the content recording playback processing apparatus is valid or invalid, wherein the apparatus-unique key is a drive public key issued to the drive apparatus;
   causing the data processor to execute communication with the drive apparatus in response to a user instruction input via an input section and to execute validity determination processing for the apparatus-unique key at least in part based on a result obtained by comparing a drive identifier with the key-validity determination data, the drive identifier being an identifier of a key held in the drive apparatus; and
   causing the data processor to output a result of the validity determination processing to an output section,
   wherein:
   the key-validity determination data comprises an invalidated-device identifier list that is an identification-information list of content recording playback processing apparatuses in which invalidated apparatus-unique keys are stored; and the data processor is configured to issue, to the drive apparatus, a request for obtaining the drive identifier recorded in a drive-public key certificate comprising the drive public key and to perform the apparatus-unique-key validity determination processing at least in part based on processing for checking whether or not the obtained drive identifier is registered in the invalidated-device identifier list.

10. At least one computer-readable storage device storing computer-executable instructions that, when executed by at least one processor, cause a content recording playback processing apparatus to execute:

causing a data processor to receive, via a communication section, key-validity determination data for determining whether an apparatus-unique key that is a key unique to the content recording playback processing apparatus is valid or invalid;

causing the data processor to execute validity determination processing for the apparatus-unique key by using the key-validity determination data in response to a user instruction input via an input section; and causing the data processor to output a result of the validity determination processing to an output section, wherein:

the apparatus-unique key comprises a device key configured to obtain a media key from a media key block in which the media key is stored, the media key configured for cryptography processing during playback of content from a medium or during recording of content to the medium:

the key-validity determination data comprises the media key block, wherein the media key block is configured to have a structure that permits a valid media key to be obtained only when a valid device key is used; and the data processor is configured to execute processing on the media key block by using the device key stored in the memory in the content recording playback processing apparatus and to perform validity determination on the device key at least in part based on processing for checking whether or not a valid media key is obtained.

11. The at least one computer-readable storage device according to claim 10, wherein the stored computer-executable instructions, when executed by the at least one processor, further cause the content recording playback processing apparatus to execute:

causing the output section to display information indicating the result of the validity determination processing.

12. At least one computer-readable storage device storing computer-executable instructions that, when executed by at least one processor, cause an content recording playback processing apparatus to execute:

causing a data processor to receive, via a communication section, key-validity determination data for determining whether an apparatus-unique key that is a key unique to a drive apparatus connected to the content recording playback processing apparatus is valid or invalid, wherein the apparatus-unique key is a drive public key issued to the drive apparatus;

causing the data processor to execute communication with the drive apparatus in response to a user instruction input via an input section and to execute validity determination processing for the apparatus-unique key at least in part based on a result obtained by comparing a drive identifier with the key-validity determination data, the drive identifier being an identifier of a key held in the drive apparatus; and causing the data processor to output a result of the validity determination processing to an output section, wherein:

the key-validity determination data comprises an invalidated-device identifier list that is an identification-information list of content recording playback processing apparatuses in which invalidated apparatus-unique keys are stored; and the data processor is configured to issue, to the drive apparatus, a request for obtaining the drive identifier recorded in a drive-public key certificate comprising the drive public key and to perform the apparatus-unique-key validity determination processing at least in part based on processing for checking whether or not the obtained drive identifier is registered in the invalidated-device identifier list.

\* \* \* \* \*